(12) United States Patent
Noguchi et al.

(10) Patent No.: US 11,872,529 B2
(45) Date of Patent: Jan. 16, 2024

(54) BUBBLE GENERATION DEVICE AND LIQUID FILTRATION DEVICE

(71) Applicant: MEIDENSHA CORPORATION, Tokyo (JP)

(72) Inventors: Hiroshi Noguchi, Singapore (SG); Akitoshi Nakagawa, Tokyo (JP); Terutake Niwa, Singapore (SG)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 18/027,006

(22) PCT Filed: Aug. 31, 2021

(86) PCT No.: PCT/JP2021/031988
§ 371 (c)(1),
(2) Date: Mar. 17, 2023

(87) PCT Pub. No.: WO2022/059478
PCT Pub. Date: Mar. 24, 2022

(65) Prior Publication Data
US 2023/0321605 A1    Oct. 12, 2023

(30) Foreign Application Priority Data
Sep. 18, 2020 (JP) .................. 2020-157702

(51) Int. Cl.
B01D 65/02 (2006.01)
B01F 23/232 (2022.01)
(Continued)

(52) U.S. Cl.
CPC ............. B01D 65/02 (2013.01); B01D 69/06 (2013.01); B01F 23/23231 (2022.01);
(Continued)

(58) Field of Classification Search
CPC ............ B01D 2321/2016; B01D 65/02; B01F 23/23231; B01F 25/40
See application file for complete search history.

(56) References Cited

U.S. PATENT DOCUMENTS

| 4,911,838 A | 3/1990 | Tanaka |
| 9,433,903 B2 | 9/2016 | Cumin et al. |

(Continued)

FOREIGN PATENT DOCUMENTS

| JP | S63-136728 U | 9/1988 |
| JP | 2016-047532 A | 4/2016 |

(Continued)

OTHER PUBLICATIONS

Kei, Kato et al—JP 2020-65976 A FIT translation—Apr. 30, 2020 (Year: 2020).*

(Continued)

*Primary Examiner* — Bradley R Spies
(74) *Attorney, Agent, or Firm* — Foley & Lardner LLP

(57) ABSTRACT

A bubble generation device is provided which is capable of discharging bubbles of about the same size from each of a plurality of bubble discharge ports. The device is provided with a bubble discharge chamber communicating with each of a plurality of bubble discharge ports, a turnaround path including a first communication port communicating with a gas storage chamber and a second communication port communicating with the bubble discharge chamber on a downstream side in a gas traveling direction of a turn-around point of the turnaround path, opening areas of the plurality of bubble discharge ports being the same as each other, and a total of the opening areas of the plurality of bubble discharge ports being smaller than an opening area of the second communication port.

9 Claims, 18 Drawing Sheets

(51) Int. Cl.
    *B01D 69/06*         (2006.01)
    *B01F 25/40*         (2022.01)
    *C02F 1/44*          (2023.01)

(52) U.S. Cl.
    CPC ............... *B01F 25/40* (2022.01); *C02F 1/44* (2013.01); *B01D 2321/02* (2013.01); *B01D 2321/2016* (2013.01); *C02F 2303/16* (2013.01)

(56) References Cited

U.S. PATENT DOCUMENTS

| | | |
|---|---|---|
| 2017/0056831 A1 | 3/2017 | Tanaka et al. |
| 2017/0120197 A1 | 5/2017 | Tanaka et al. |

FOREIGN PATENT DOCUMENTS

| | | |
|---|---|---|
| JP | 2018-079442 A | 5/2018 |
| JP | 2018-176113 A | 11/2018 |
| JP | 2018-202372 A | 12/2018 |
| JP | 2020-065976 A | 4/2020 |
| WO | WO-2015/146611 A1 | 10/2015 |
| WO | WO-2015/146686 A1 | 10/2015 |

OTHER PUBLICATIONS

Unpublished U.S. National Stage of PCT Application No. PCT/JP2021/031993, Mar. 17, 2023, Noguchi et al.

\* cited by examiner

BUBBLE GENERATION DEVICE AND LIQUID FILTRATION DEVICE

TECHNICAL FIELD

The present invention relates to a bubble generation device and a liquid filtration device using the same.

BACKGROUND ART

In the related art, in a liquid filtration device that filters a liquid by a filtration membrane, in order to suppress clogging of the filtration membrane, it is common to peel off contaminants from a surface of the filtration membrane by scrubbing. The scrubbing is a method in which bubbles are discharged from below the filtration membrane toward the filtration membrane by a bubble generation device, and liquid near the surface of the filtration membrane is vigorously oscillated by the bubbles.

A known bubble generation device includes a gas storage chamber, a turnaround path communicating with an upper portion of the gas storage chamber, and a plurality of bubble discharge ports. The gas storage chamber stores liquid therein and stores gas supplied into the liquid above the liquid. The turnaround path communicates with the upper portion of the gas storage chamber, extends downward, turns back, and extends upward. The air passing through the turnaround path is discharged as bubbles from each of the plurality of bubble discharge ports.

As the bubble generation device having such a configuration, a gas sparger described in Patent Literature 1 is known. The gas sparger includes a housing, a conduit as a turnaround path, and a cover. A gas storage chamber partitioned by a partition plate is provided in the housing. The cover including two holes (bubble discharge ports) is fixed to an upper portion of the gas storage chamber. The conduit as the turnaround path has a shape like an alphabet "U". In addition, the conduit has a first opening at one end and a second opening at the other end in a gas flow direction in the pipe. The first opening communicates with an upper portion of the gas storage chamber. The gas that has entered the conduit from the gas storage chamber through the first opening moves along the shape of the "U" of the conduit and then is delivered out of the conduit through the second opening. Thereafter, the gas is discharged as bubbles from each of the two holes provided in the cover.

CITATION LIST

Patent Literature

Patent Literature 1: JP 2016-47532 A

SUMMARY OF INVENTION

Technical Problem

In order to apply an equal shearing force to the entire filtration membrane or to apply about the same shearing force to each of the plurality of filtration membranes arranged in parallel, it is desirable to discharge bubbles of about the same size from each of the plurality of bubble discharge ports. However, in the gas sparger described in Patent Literature 1, it is difficult to discharge bubbles of about the same size from each of the two holes (bubble discharge ports).

The present invention has been made in view of the above background, and an object of the present invention is to provide a bubble generation device capable of discharging bubbles of about the same size from each of a plurality of bubble discharge ports, and a liquid filtration device using the bubble generation device.

Solution to Problem

According to an aspect of the present invention, there is provided a bubble generation device configured to intermittently discharge bubbles from each of a plurality of bubble discharge ports, the bubble generation device including: a gas storage chamber that stores a liquid therein and stores a gas supplied into the liquid above the liquid; a turnaround path that communicates with an upper portion of the gas storage chamber, extends downward, turns back, and extends upward; the plurality of bubble discharge ports that discharge the gas passing through the turnaround path as bubbles; and a bubble discharge chamber that communicates with each of the plurality of bubble discharge ports, in which the turnaround path includes a first communication port communicating with the gas storage chamber and a second communication port communicating with the bubble discharge chamber on a downstream side of a turn-around point of the turnaround path in a gas traveling direction, opening areas of the plurality of bubble discharge ports are the same as each other, and a sum of the opening areas is smaller than an opening area of the second communication port.

Advantageous Effects of Invention

According to the present invention, there is an excellent effect that bubbles of about the same size can be discharged from each of the plurality of bubble discharge ports.

DESCRIPTION OF EMBODIMENTS

Figure 1:
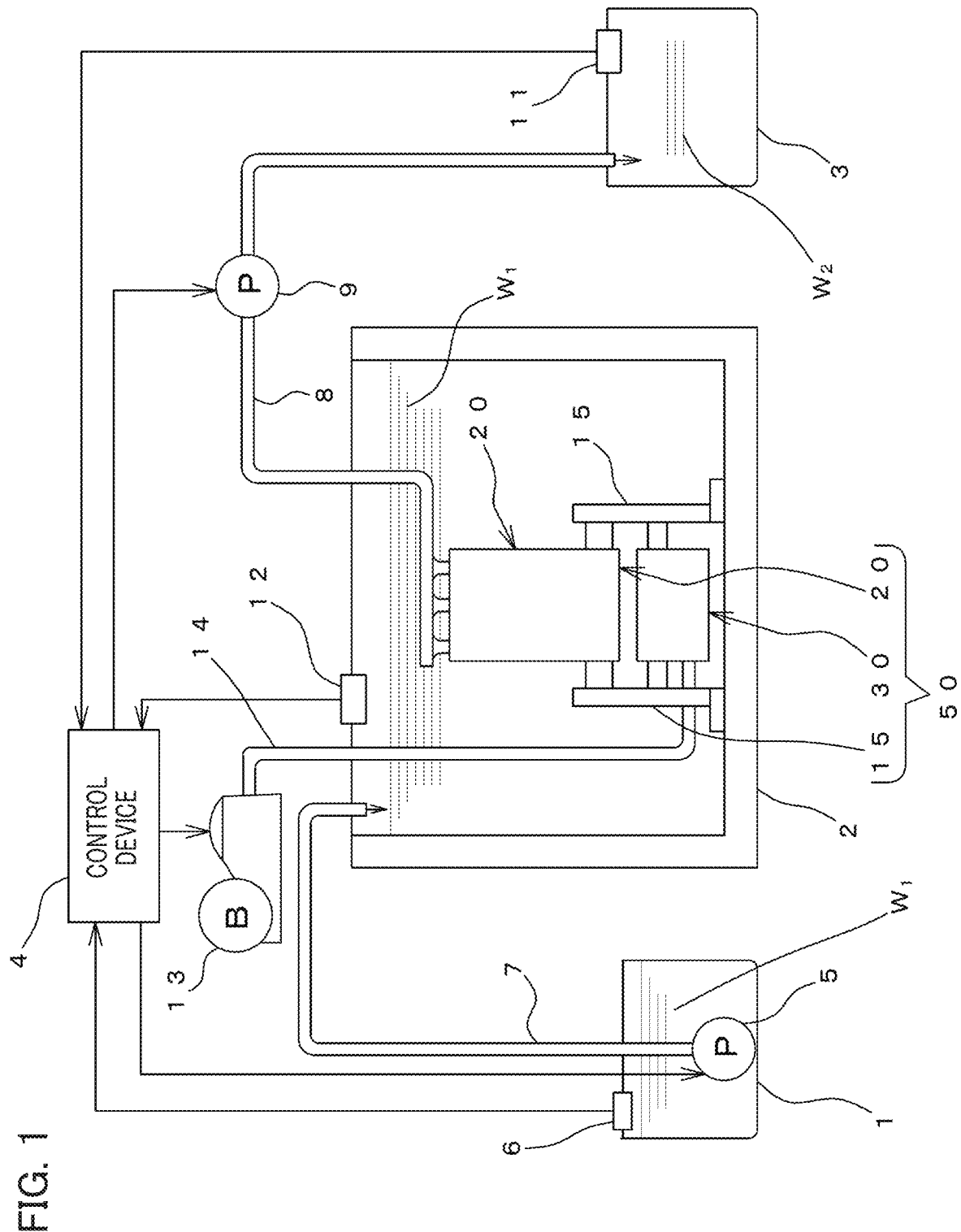
FIG. 1 is a diagram illustrating a schematic configuration of a water treatment facility using a liquid filtration device according to an embodiment.

Hereinafter, an embodiment of a liquid filtration device to which the present invention is applied will be described with reference to the drawings. In the embodiment, for easy understanding, structures and elements other than the main part of the present invention will be described in a simplified or omitted manner. In each drawing, the same elements are denoted by the same reference numerals. Note that the shapes, dimensions, and the like of the respective elements illustrated in the respective drawings are schematically illustrated, and do not indicate actual shapes, dimensions, and the like.

FIG. 1 is a diagram illustrating a schematic configuration of a water treatment facility using a liquid filtration device according to an embodiment. The water treatment facility includes a raw water tank 1, a filtration treatment water tank 2, a treated water tank 3, a control device 4, a raw water pump 5, a first water level sensor 6, a raw water transfer pipe 7, a treated water transfer pipe 8, a suction pump 9, a second water level sensor 11, a third water level sensor 12, and the like. The water treatment facility includes a blower 13, an air supply pipe 14, a frame 15, a membrane module 20, a bubble generation device 30, and the like.

In the raw water tank 1, raw water (water before treatment) $W_1$ as a liquid is stored. The first water level sensor including an ultrasonic sensor or the like installed in the raw water tank 1 detects a water level (water surface height) of the raw water $W_1$ in the raw water tank 1, and transmits the detection result to the control device 4 as a water level signal. The raw water pump 5 installed in the raw water tank 1 sucks and discharges the raw water $W_1$ in the raw water tank 1, and sends the raw water $W_1$ to the filtration treatment water tank 2 through the raw water transfer pipe 7. As the raw water pump 5, one including a submersible pump has been exemplified, but one including a land pump may be used.

The filtration treatment water tank 2 is a water tank made of reinforced concrete. A liquid filtration device 50 is installed in the filtration treatment water tank 2. The liquid filtration device 50 includes the frame 15, the membrane module 20, and the bubble generation device 30, and the whole thereof is immersed in the raw water $W_1$ in the filtration treatment water tank 2. The blower 13 discharges air as a gas sucked from a suction port to the air supply pipe 14 through a discharge port. The air discharged to the air supply pipe 14 is supplied to the bubble generation device 30 of the liquid filtration device 50. The third water level sensor 12 installed in the filtration treatment water tank 2 detects the water level of the raw water $W_1$ in the filtration treatment water tank 2, and transmits the detection result as a water level signal to the control device 4.

The suction pump 9 sucks the raw water $W_1$ in the filtration treatment water tank 2 through the treated water transfer pipe 8 and a membrane element described later installed in the membrane module 20. The sucked raw water $W_1$ is filtered by the membrane element to become treated water $W_2$, and then, the treated water $W_2$ is sent to the treated water tank 3 through the treated water transfer pipe 8. The second water level sensor 11 set in the treated water tank 3 detects the water level of the treated water $W_2$ in the treated water tank 3, and transmits the detection result as a water level signal to the control device 4.

Instead of the suction pump 9, a pump that generates suction force using hydraulic head pressure may be used. Means for suction is not particularly limited.

When the water level of the treated water tank 3 does not reach an upper limit and a predetermined operation execution condition is satisfied, the control device 4 operates the suction pump 9 and the blower 13 to execute the filtration treatment of the raw water $W_1$. However, even when the operation execution condition is satisfied, when the water level of the raw water $W_1$ in the raw water tank 1 is equal to or less than a lower limit and when the water level of the raw water $W_1$ in the filtration treatment water tank 2 is equal to or less than a lower limit, the control device 4 stops the execution of the filtration treatment. The role of the blower 13 will be described later.

Figure 2:
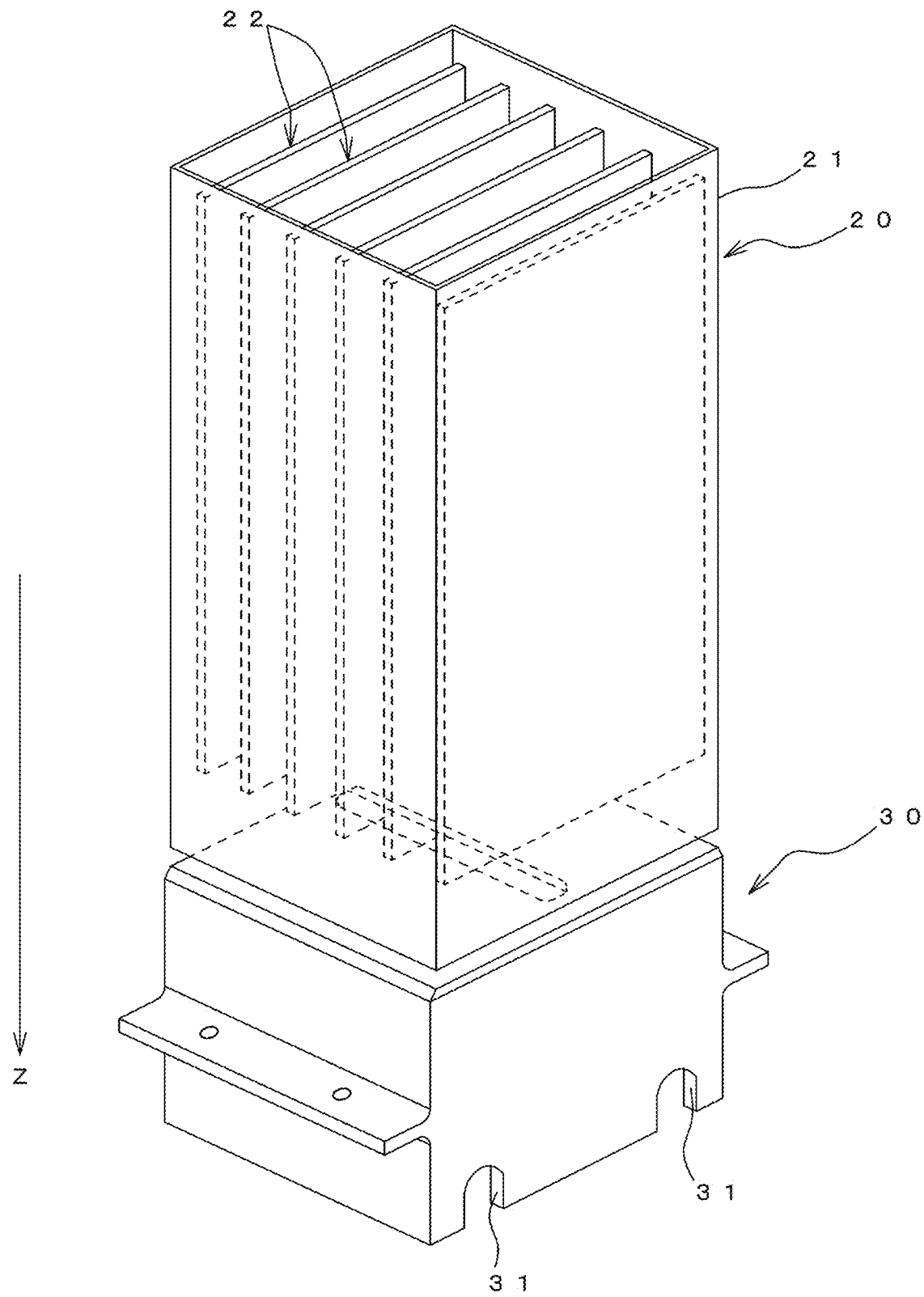
FIG. 2 is a perspective view illustrating a membrane module and a bubble generation device of the liquid filtration device.

FIG. 2 is a perspective view illustrating the membrane module 20 and the bubble generation device 30 of the liquid filtration device (50) according to the embodiment. In the drawing, Z represents a gravity direction. Hereinafter, the configuration of the liquid filtration device (50) will be described with reference to the drawings. When a term "vertical direction" is used, the term "vertical direction" means a direction in which the membrane module 20 and the bubble generation device 30 face each other regardless of the postures of the membrane module 20 and the bubble generation device 30 illustrated in the drawings. When a term "upward" is used, the term "upward" means a direction toward the upper side along the "vertical direction" regardless of the postures of the membrane module 20 and the bubble generation device 30 illustrated in each drawing. When a term "downward" is used, the term "downward" means a direction toward the lower side along the "vertical direction" regardless of the postures of the membrane module 20 and the bubble generation device 30 illustrated in each drawing. When a term "horizontal direction" is used, the term "horizontal direction" means a direction orthogonal to the "vertical direction" regardless of the postures of the membrane module 20 and the bubble generation device 30 illustrated in each drawing.

The membrane module 20 includes a rectangular tubular casing 21 and a plurality of membrane elements 22. The plurality of membrane elements 22 have a plate shape, are arranged in a straight line at intervals along the "horizontal direction" in the casing 21, and are held by an inner surface of the casing 21.

The box-shaped bubble generation device 30 is disposed "below" (directly below) the membrane module 20. The bubble generation device 30 includes two pipe connection portions 31 on a side plate, and the above-described air supply pipe (14 in FIG. 1) is connected to each of the pipe connection portions 31.

Figure 3:
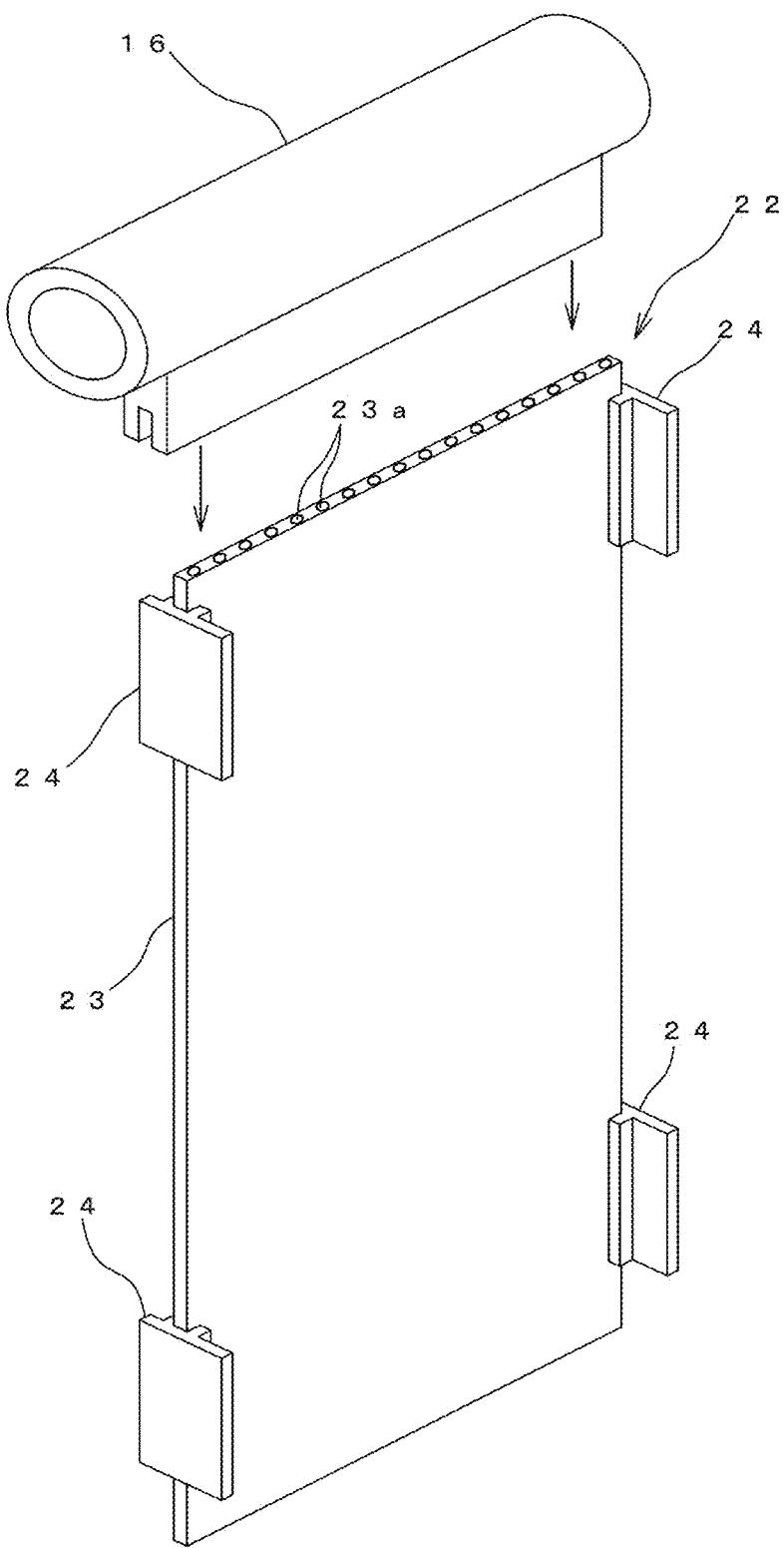
FIG. 3 is a perspective view illustrating a membrane element and a socket pipe of the membrane module.

FIG. 3 is a perspective view illustrating the membrane element 22 and a socket pipe 16. The membrane element 22 includes a filtration membrane 23 and four holding members

24. In the liquid filtration device (50) according to the embodiment, the filtration membrane 23 made of a plate-like flat membrane is used, but the type of filtration membrane 23 is not limited to the flat membrane, and other types such as a hollow fiber membrane may be used. The material of the filtration membrane 23 may be an organic material such as polyvinyl chloride (PVC) or polyvinylidene fluoride (PVDF), or may be a ceramic composed of one kind or a plurality of kinds of alumina, cordierite, silicon carbide, and other metal oxides. In addition, the filtration membrane 23 may be a composite membrane in which an organic membrane and a ceramic membrane are combined.

The filtration membrane 23 includes a plurality of hollows 23a extending in the vertical direction. These hollows 23a are arranged at predetermined intervals in a lateral direction of the filtration membrane 23, and an upper end of the hollow 23a is an opening facing "upward".

The socket pipe 16 is attached to an upper end portion of filtration membrane 23. The treated water transfer pipe (8 in FIG. 1) is connected to the socket pipe 16. When the suction pump (9 in FIG. 1) is operated, a suction force is generated on the surface of the filtration membrane 23, and the raw water ($W_1$ in FIG. 1) existing around the filtration membrane 23 is sucked into the hollow 23a through countless fine holes of the filtration membrane 23. At this time, the raw water $W_1$ is filtered, and contaminants in the raw water $W_1$ remain on the surface of the filtration membrane 23.

Each of the four holding members 24 is engaged with an engaging portion provided on an inner surface of the casing (21 in FIG. 2) in a state of being fixed near a corner of the filtration membrane 23.

The bubble generation device 30 installed "below" the membrane module 20 discharges bubbles towards the membrane module 20 "above" the bubble generation device. The discharged bubbles float in the raw water $W_1$ and enter the casing 21 through the opening at the lower end of the casing 21 of the membrane module 20. Thereafter, the bubbles reach the lower ends of the plurality of filtration membranes 23, are divided into a plurality of parts by filtration membranes 23, and then enter a region (hereinafter, referred to as an "inter-membrane region") between filtration membranes 23 adjacent to each other. The bubbles floating in the "inter-membrane region" intensely oscillate raw water $W_1$ near the surface of filtration membrane 23 to peel off the contaminants adhering to the surface of filtration membrane 23.

Note that the shape of the casing 21 is a shape surrounding four sides of the plurality of membrane elements 22 as illustrated in the drawing, but may be a shape having an opening in a part of a side surface of the casing 21 as long as the bubbles do not largely leak from the inside of the casing 21.

Figure 4:
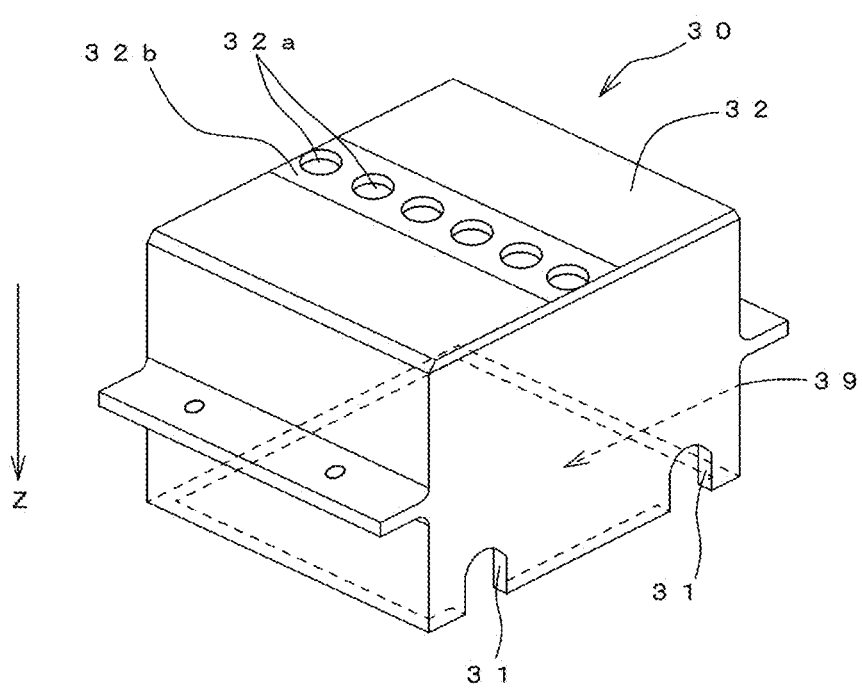
FIG. 4 is a perspective view illustrating the bubble generation device of the liquid filtration device.

FIG. 4 is a perspective view illustrating the bubble generation device 30. A rectangular elongated hole is formed in a top plate 32 of the bubble generation device 30. A rectangular cover plate 32b is fixed to the top plate 32 so as to cover the elongated hole. In the cover plate 32b, six bubble discharge ports 32a having a perfect circular shape are formed to be arranged on a straight line. The bubble generation device 30 does not include a bottom plate, and includes a lower end opening 39 that is largely opened "downward" at the lower end of the bubble generation device 30.

Figure 5:
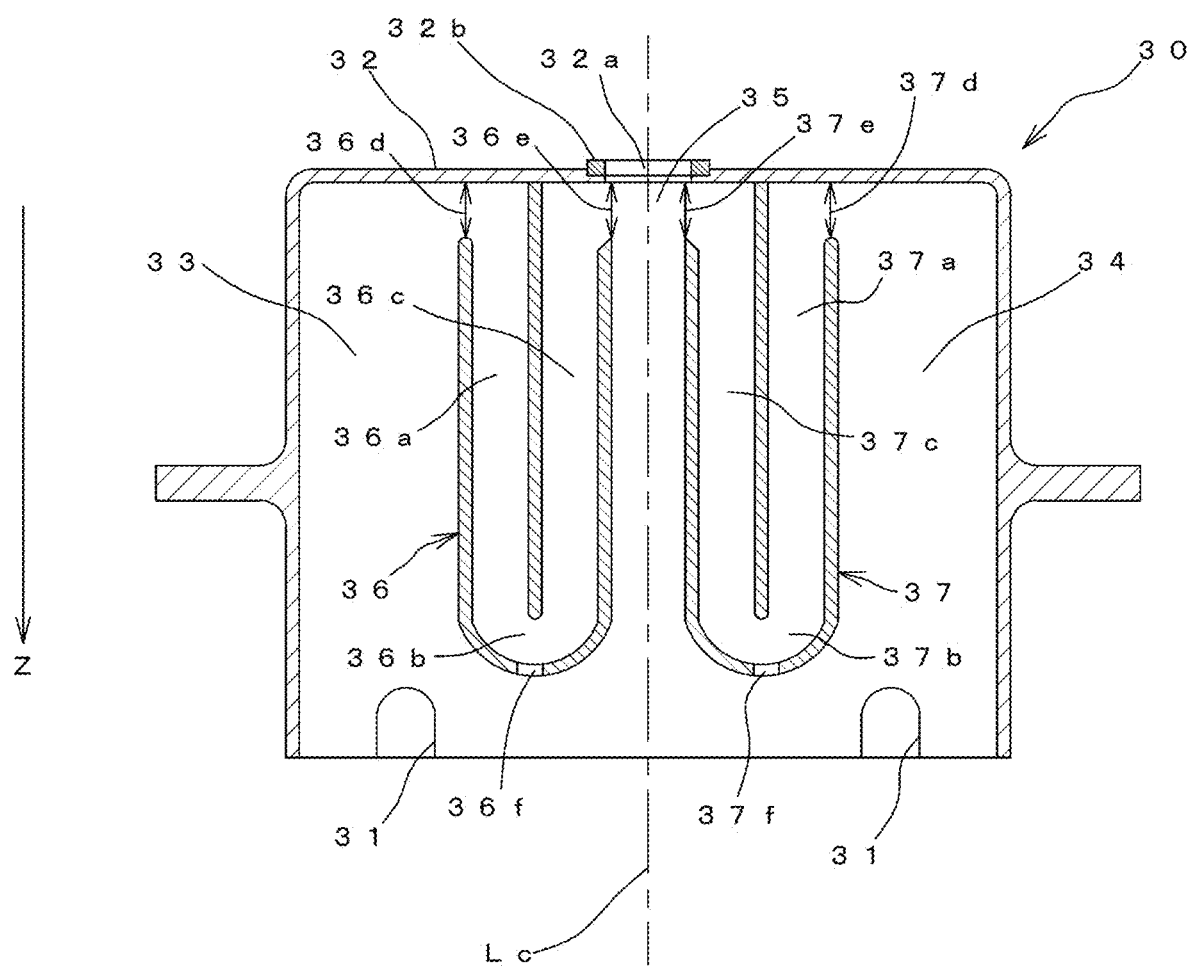
FIG. 5 is a cross-sectional view of the bubble generation device.
Figure 6:
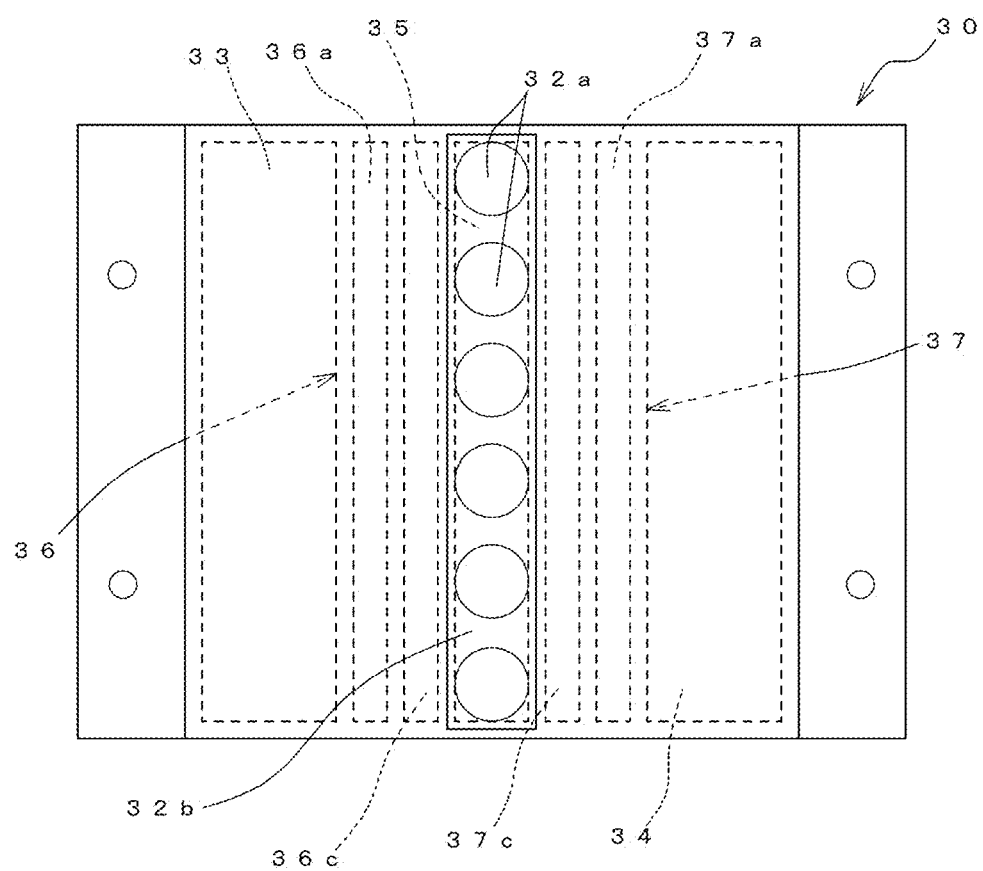
FIG. 6 is a plan view of the bubble generation device.

FIG. 5 is a cross-sectional view of the bubble generation device 30. FIG. 6 is a plan view of the bubble generation device 30. The bubble generation device 30 includes a first gas storage chamber 33, a second gas storage chamber 34, a bubble discharge chamber 35, a first turnaround path 36, a second turnaround path 37, and the like.

A dashed-dotted line in FIG. 5 is a center line Lc of the top plate 32. Each of the six bubble discharge ports 32a that discharge bubbles of air as a gas is arranged such that the center thereof is positioned at the center line Lc of the top plate 32 and is opened "upward". The bubble discharge chamber 35 is disposed "below" (immediately below) the six bubble discharge ports 32a, and communicates with each of the six bubble discharge ports 32a.

As illustrated in FIG. 6, the shape of the bubble discharge chamber 35 is an elongated shape extending along an arrangement direction of the six bubble discharge ports 32a. As illustrated in FIG. 5, the first turnaround path 36 is adjacent to the bubble discharge chamber 35 on one side in a direction orthogonal to the above-described arrangement direction. The second turnaround path 37 is adjacent to the bubble discharge chamber 35 on the other side in the direction orthogonal to the above-described arrangement direction. Hereinafter, the direction orthogonal to the arrangement direction of the six bubble discharge ports 32a is simply referred to as an "arrangement orthogonal direction".

The structure of the second turnaround path 37 is a structure that is line-symmetric with respect to the center line Lc with respect to the first turnaround path 36. The first gas storage chamber 33 is adjacent to the first turnaround path 36 on one side in the "arrangement orthogonal direction". The second gas storage chamber 34 is adjacent to the second turnaround path 37 on the other side in the "arrangement orthogonal direction". The structure of the second gas storage chamber 34 is a structure that is line-symmetric with respect to the center line Lc with respect to the first gas storage chamber 33.

The first turnaround path 36 includes a lowering portion 36a extending from a first communication port 36d toward the "lower side", a turnaround portion 36b turning back toward the "upper side", and a rising portion 36c extending toward the "upper side" and communicating with a second communication port 36e. The second turnaround path 37 also includes a similar lowering portion 37a, a similar turnaround portion 37b, and a similar rising portion 37c.

Figure 7:
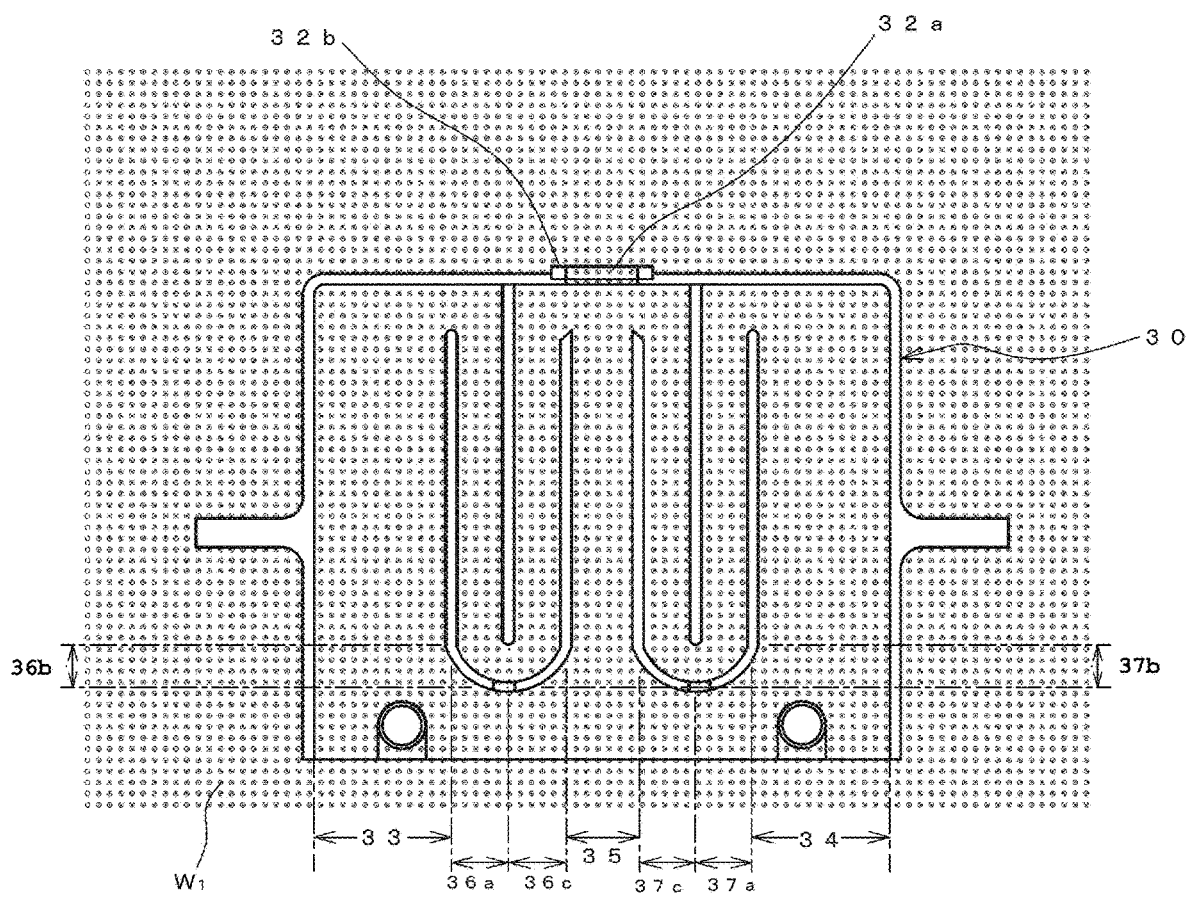
FIG. 7 is a cross-sectional view illustrating the bubble generation device in a non-operating state.

FIG. 7 is a cross-sectional view illustrating the bubble generation device 30 in a non-operating state. In the drawing, hatching in the cross section of the bubble generation device 30 is omitted for easy viewing. In the bubble generation device 30 in the non-operating state, as illustrated in the drawing, most of an internal space of the bubble generation device 30 is filled with the raw water $W_1$.

The bubble generation device 30 can intermittently form bubbles from the bubble discharge ports 32a. Hereinafter, processing from when the bubbles are discharged from the bubble discharge port 32a to immediately before the bubbles are discharged from the bubble discharge port 32a is referred to as batch processing.

Figure 8:
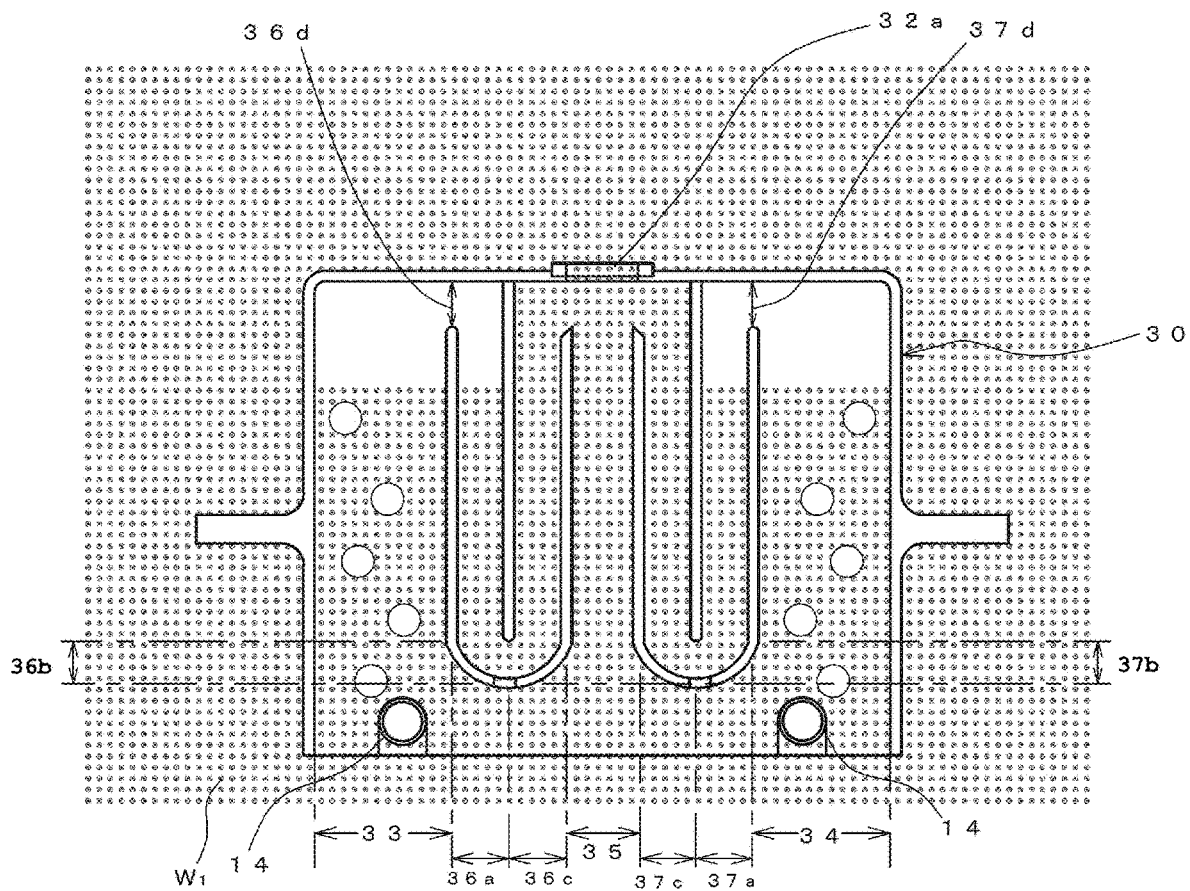
FIG. 8 is a cross-sectional view illustrating the bubble generation device in a state of a first phase in batch processing.

FIG. 8 is a cross-sectional view illustrating the bubble generation device 30 in a state of a first phase in the batch processing. One of the two air supply pipes 14 connected to the bubble generation device 30 opens below the first gas storage chamber 33 and supplies air to the raw water $W_1$ in the first gas storage chamber 33. The other gas storage chamber opens below the second gas storage chamber 34 to supply air to the raw water $W_1$ in the second gas storage chamber 34.

In the first phase of the batch processing, the air supplied into the raw water $W_1$ by one of the two air supply pipes 14 floats in the raw water $W_1$ and is stored in the upper portion of the first gas storage chamber 33. A part of the air stored in the upper portion of the first gas storage chamber 33 in this manner enters the lowering portion 36a of the first turnaround path 36 through the first communication port 36d. In the first gas storage chamber 33 and the lowering portion 36a of the first turnaround path 36, the water level of the raw water $W_1$ is lowered as the storage amount of air increases. The water level of the raw water $W_1$ in the first gas storage chamber 33 is substantially the same as the water level of the raw water $W_1$ in the first turnaround path 36.

In the first gas storage chamber 33, the amount of the raw water $W_1$ corresponding to the lowering of the water level of the raw water $W_1$ flows out to the outside of the bubble generation device 30 through the lower end opening (39 in FIG. 4) of the bubble generation device 30. Further, in the lowering portion 36a of the first turnaround path 36, the raw water $W_1$ having the amount corresponding to the lowering of the water level of the raw water $W_1$ enters the turnaround portion 36b. Along with this entry, substantially the same amount of the raw water $W_1$ rises in the rising portion 36c of the first turnaround path 36, and enters the bubble discharge chamber 35 through the second communication port (36e in FIG. 5). With this entry, substantially the same amount of the raw water $W_1$ flows out of the bubble generation device 30 through the lower end opening or the bubble discharge port 32a of the bubble generation device 30.

Although the behaviors of the air and the raw water $W_1$ in the first gas storage chamber 33 and the first turnaround path 36 have been described, the same applies to the behaviors of the air and the raw water $W_1$ in the second gas storage chamber 34 and the second turnaround path 37.

Figure 9:
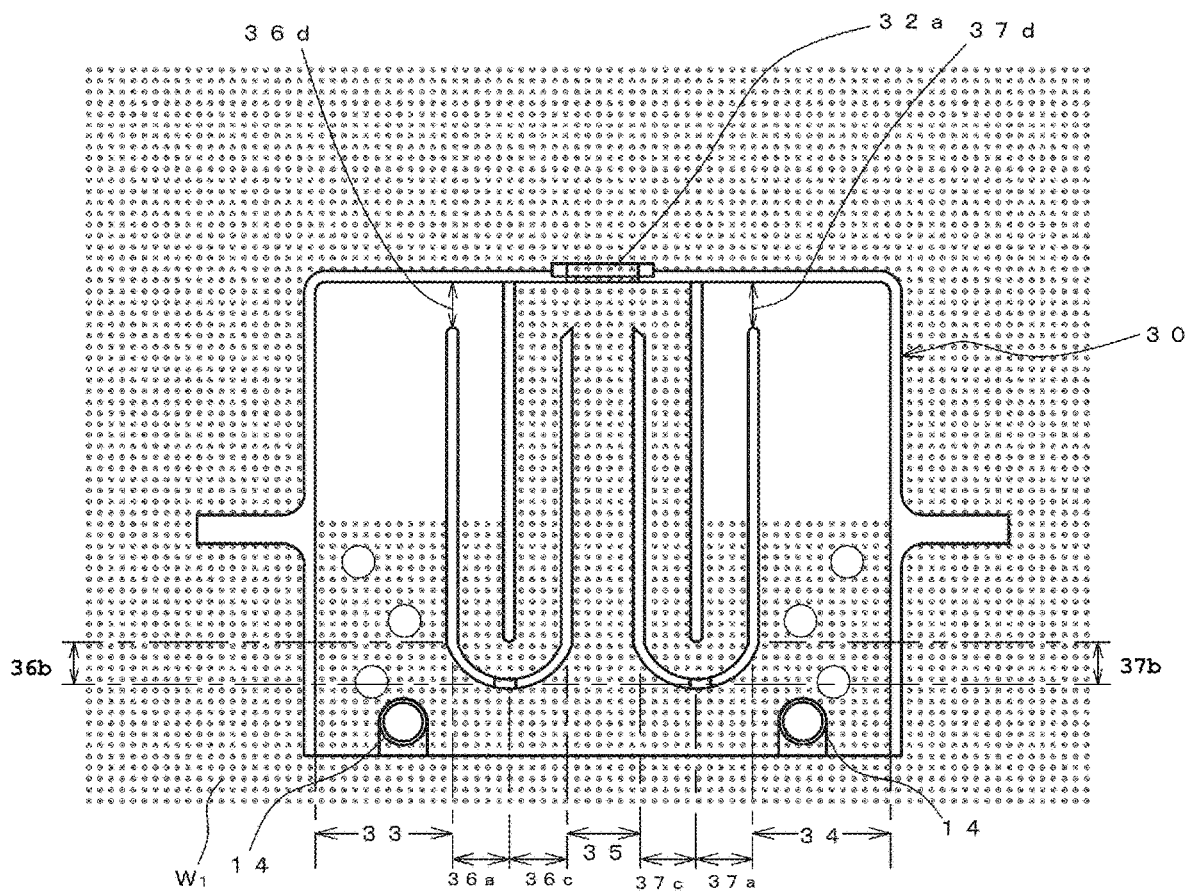
FIG. 9 is a cross-sectional view illustrating the bubble generation device in a state of a second phase in the batch processing.

FIG. 9 is a cross-sectional view illustrating the bubble generation device 30 in a state of a second phase in the batch processing. In the second phase of the batch processing, a storage amount of air in each of the first gas storage chamber 33, the lowering portion 36a of the first turnaround path 36, the second gas storage chamber 34, and the lowering portion 37a of the second turnaround path 37 increases and the water level of the raw water $W_1$ is lowered as compared with the first phase.

Immediately before the end of the second phase of the batch processing, in the first turnaround path 36, the air in the lowering portion 36a enters the turnaround portion 36b and exceeds a turn-around point of the turnaround portion 36b.

Figure 10:
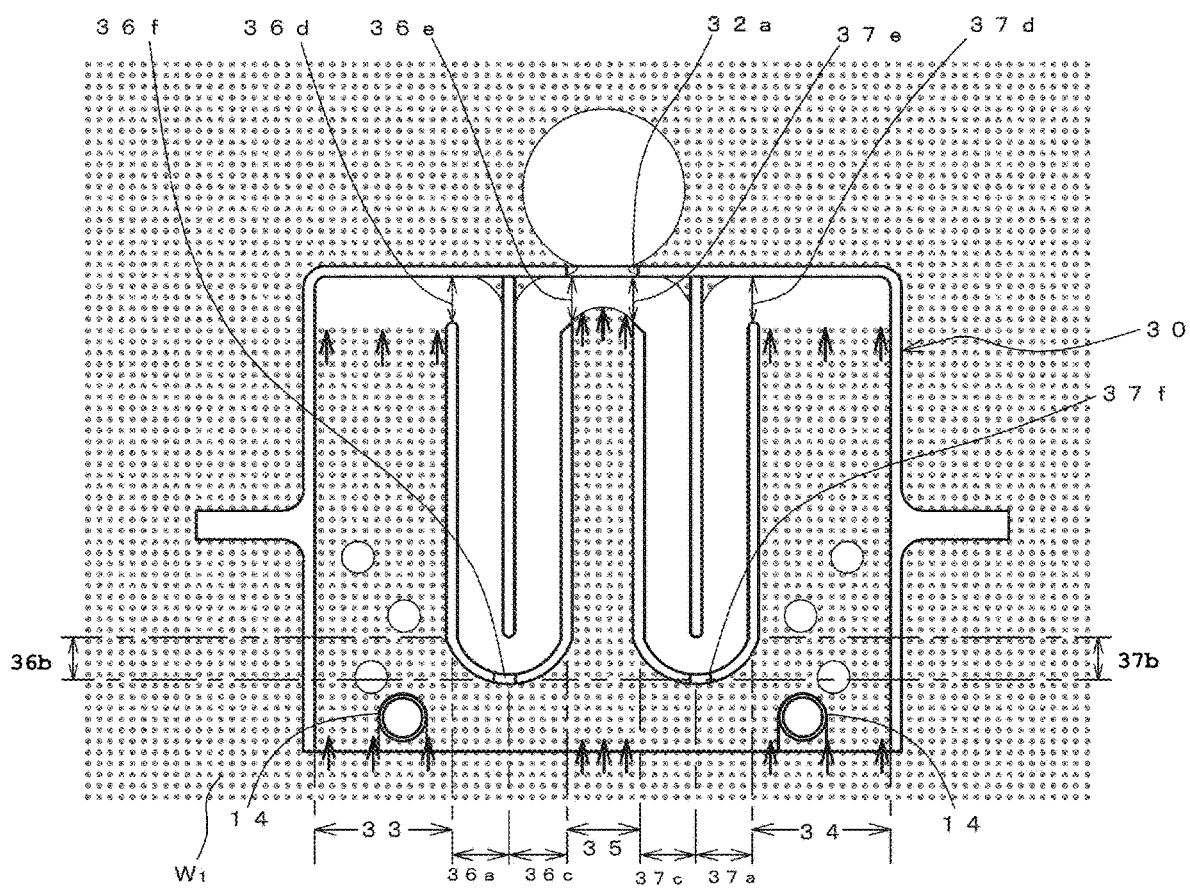
FIG. 10 is a cross-sectional view illustrating the bubble generation device in a state of a third phase in the batch processing.

FIG. 10 is a cross-sectional view illustrating the bubble generation device 30 in a state of a third phase of the batch processing. In the third phase, the air that has passed through the turn-around point rises at a high speed in the rising portion 36c of the first turnaround path 36 and reaches the second communication port 36e, and further exits to the outside of the bubble generation device 30 through the bubble discharge chamber 35 and the bubble discharge port 32a. In synchronization with such an air behavior, the air in the first gas storage chamber 33 enters the lowering portion 36a of the first turnaround path 36 through the first communication port 36d and lowers at a high speed in the lowering portion 36a.

Although the behaviors of the air in the first gas storage chamber 33 and the first turnaround path 36 have been described, the same applies to the behaviors of the air in the second gas storage chamber 34 and the second turnaround path 37. Above the bubble discharge port 32a, air discharged from the first turnaround path 36 to the outside via the bubble discharge chamber 35 and air discharged from the second turnaround path 37 to the outside via the bubble discharge chamber 35 are integrated to form an air assembly having a circular cross section.

The reason why the large air assembly as described above is formed above the bubble discharge port 32a is as follows.

That is, it is assumed that the flow of the rising air toward the bubble discharge port 32a in the bubble discharge chamber 35 is faster than the flow of the air entering the bubble discharge chamber 35 from the rising portion (36c, 37c) through the second communication port (36e, 37e). In this case, a moving speed of the air in the bubble discharge chamber 35 is faster than a moving speed of the air flowing into the bubble discharge chamber 35 from the second communication port (36e, 37e). Then, a negative pressure is generated in the bubble discharge chamber 35. With this negative pressure, the raw water $W_1$ in the bubble discharge chamber 35 is drawn into the air, and a gas-liquid mixed flow of the air and the raw water $W_1$ is generated. As a result, the air that has entered the bubble discharge chamber 35 from the turnaround path (36, 37) through the second communication port (36e, 37e) is divided by the gas-liquid mixed flow, and does not grow into large bubbles.

One of the causes of the moving speed of the air in the bubble discharge chamber 35 being faster than the moving speed of the air flowing into the bubble discharge chamber 35 from the second communication port (36e, 37e) is a flow path resistance of the turnaround portion (36b, 37b).

Therefore, the bubble generation device 30 according to the embodiment includes a lower end opening (39 in FIG. 4) as an opening facing downward at the lower end of each of the two gas storage chambers (33, 34) and the bubble discharge chamber 35. Since the two gas storage chambers (33, 34) and the bubble discharge chamber 35 communicate with each other at respective lower portions, the lower end opening (39 in FIG. 4) functions as a common opening of the two gas storage chambers (33, 34) and the bubble discharge chamber 35. Strictly speaking, in the entire lower end opening (39 in FIG. 4), a region immediately below the first gas storage chamber 33 is an opening facing downward at the lower end of the first gas storage chamber 33, and a region immediately below the second gas storage chamber 34 is an opening facing downward at the lower end of the second gas storage chamber 34. A region immediately below the bubble discharge chamber 35 is an opening facing downward at the lower end of the bubble discharge chamber 35.

When the air in the bubble discharge chamber 35 starts to be discharged to the outside through the bubble discharge port 32a, the air existing in the vicinity of the turnaround portion (36b, 37b) starts to move at a speed slightly slower than the preceding air due to the flow path resistance. Then, a slight negative pressure is generated in the bubble discharge chamber 35, but as indicated by a thick arrow in FIG. 10, the raw water $W_1$ existing below the air applies a force directed upward to the air existing above. At this time, immediately below the bubble discharge chamber 35, the raw water $W_1$ existing below the bubble generation device 30 tries to enter the inside of the bubble generation device 30 through the lower end opening (39 in FIG. 4), thereby supporting the above-described force. At the same time, in each of the two gas storage chambers (33, 34), the raw water $W_1$ existing below the air applies a force of pushing the air existing above into the turnaround path (36, 37) through the first communication port (36d, 37d). At this time, immediately below each of the two gas storage chambers (33, 34), the raw water $W_1$ existing below the bubble generation device 30 tries to enter the inside of the bubble generation device 30 through the lower end opening (39 in FIG. 4), thereby supporting the above-described force.

As a result, the air in each of the two turnaround paths (36, 37) smoothly follows the preceding air in the bubble discharge chamber 35, and quickly flows into the bubble discharge chamber 35 through the second communication port (36e, 37e). Therefore, according to the bubble generation device 30 according to the embodiment, the succeeding air can be smoothly moved toward the bubble discharge port 32a in a state of being continuous with the preceding air without being divided from the preceding air, and can be discharged from the bubble discharge port 32a as large-diameter bubbles.

However, when a ratio between an opening area of the second communication port (36e, 37e) and a cross-sectional area of the bubble discharge chamber 35 in the horizontal direction is inappropriate, a large negative pressure is intensively generated near the second communication port (36e, 37e) in the bubble discharge chamber 35. When the negative pressure is intensively generated in this manner, the raw water $W_1$ existing at an interface with the air is drawn into the air and mixed in the vicinity of the second communication port (36e, 37e) in the bubble discharge chamber 35. Then, the mixed raw water $W_1$ may separate the subsequent air from the preceding air to reduce the bubble diameter.

Figure 11:
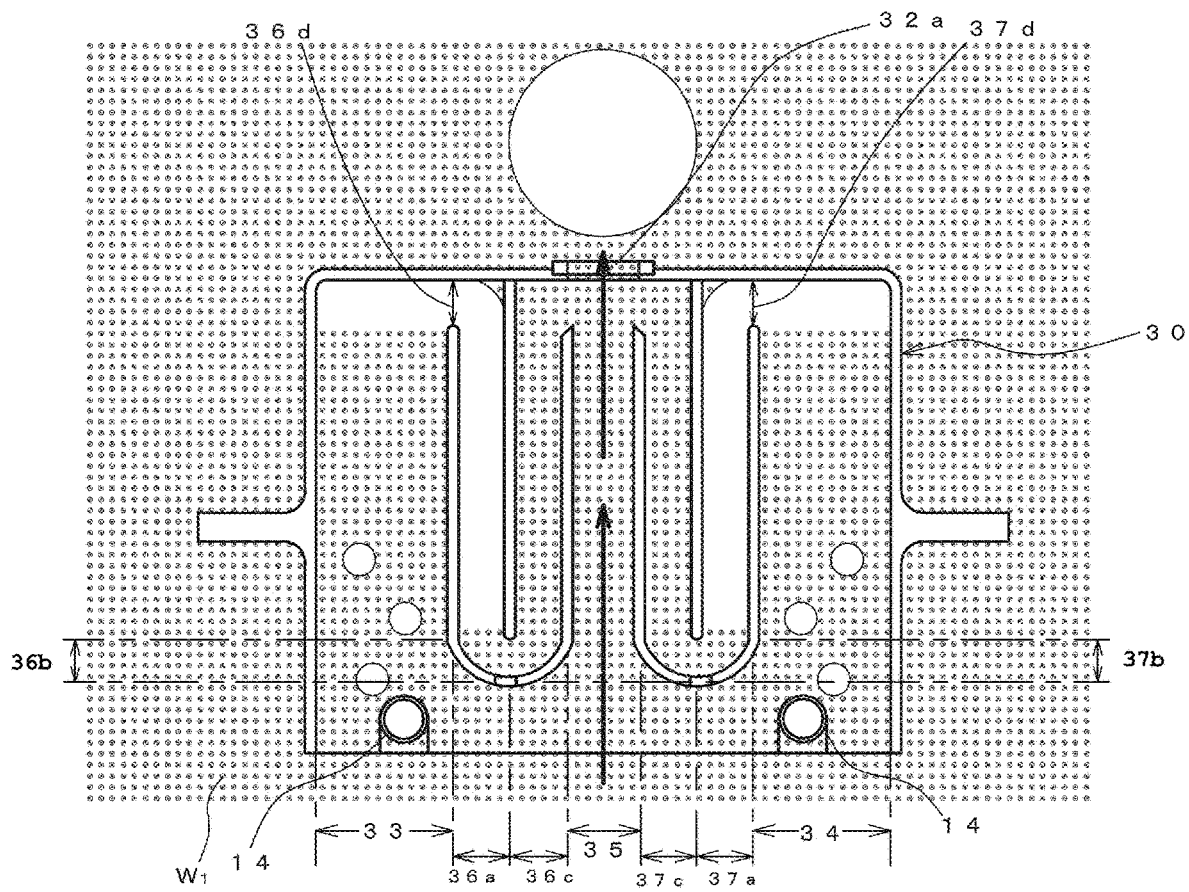
FIG. 11 is a cross-sectional view illustrating the bubble generation device in a state of a fourth phase in the batch processing.

Therefore, in the bubble generation device 30 according to the embodiment, the cross-sectional area of the bubble discharge chamber 35 in the horizontal direction is equal to or more than the sum of the opening area of the second communication port 36e of the first turnaround path 36 and the opening area of the second communication port 37e of the second turnaround path 37. In such a configuration, in the bubble discharge chamber 35, the negative pressure that starts to be generated near the outlet of the second communication port (36e, 37e) does not concentrate near the outlet, but propagates in the horizontal direction away from the vicinity of the outlet in the bubble discharge chamber 35 and is uniformized. Therefore, the air does not draw in the raw water $W_1$ near the outlet of the second communication port (36e, 37e) of the bubble discharge chamber 35. Then, as illustrated in the drawing, "external preceding air", "internal succeeding air", the air inside each of the two turnaround paths (36, 37), and the air inside each of the two gas storage chambers (33, 34) move integrally and continuously without being divided. As a result, as illustrated in FIG. 11 (fourth phase), the bubble generation device 30 according to the embodiment can efficiently peel off contaminants from the surface of the filtration membrane by forming bubbles having a large diameter above the bubble discharge port 32a and discharging the bubbles toward the filtration membrane (23 in FIG. 3).

As described above, the opening provided at the lower end of the bubble discharge chamber 35 is a region immediately below the bubble discharge chamber 35 in the entire region of the lower end opening (39 in FIG. 4). That is, the opening area of the opening provided at the lower end of the bubble discharge chamber 35 is the same as the cross-sectional area of the bubble discharge chamber 35 in the horizontal direction. In such a configuration, in the bubble discharge chamber 35, when bubbles are discharged, the force for pushing up the upper air by the raw water $W_1$ existing below the air can be made uniform without concentrating the force on a part in a cross-sectional direction. As a result, it is possible to more reliably suppress drawing of the raw water $W_1$ existing in the vicinity of the interface with the air by the air and to more reliably increase the diameter of the bubble.

As described above, the opening provided at the lower end of the gas storage chamber (33, 34) is a region immediately below the gas storage chamber (33, 34) in the entire region of the lower end opening (39 in FIG. 4). That is, the opening area of the opening provided at the lower end of the gas storage chamber (33, 34) is the same as the cross-sectional area of the gas storage chamber (33, 34). In such a configuration, when the bubbles are discharged from the bubble discharge port 32a, in the gas storage chamber (33, 34), the force for pushing up the upper air by the raw water $W_1$ existing below the air can be made uniform without concentrating the force on a part of the cross-sectional direction. As a result, it is possible to suppress the inflow of the raw water $W_1$ from the gas storage chamber (33, 34) to the turnaround path (36, 37) by suppressing the drawing of the raw water $W_1$ existing in the vicinity of the interface with the air by the air.

When the sum of the opening areas of the six bubble discharge ports 32a is smaller than the sum of the opening areas of the two second communication ports (36e, 37e), the moving speed of the air fluctuates when the air passes through the bubble discharge ports 32a. However, since most of the air in the bubble discharge chamber 35 rises at a stable speed toward the bubble discharge port 32a, the air does not rise at a speed higher than the inflow speed of the air from the second communication port (36e, 37e). Therefore, the air does not draw in the raw water $W_1$ at the interface with the raw water $W_1$.

In the drawing, the air assembly formed on one bubble discharge port 32a is illustrated, but a similar air assembly is also formed on another bubble discharge port 32a not illustrated. The sizes of the air assemblies are approximately the same. The air assemblies having substantially the same size are formed for the following reason.

That is, in the bubble generation device 30 according to the embodiment, the opening areas of the six bubble discharge ports 32a are the same as each other. In the bubble generation device 30, the sum of the opening areas of the six bubble discharge ports 32a is smaller than the sum of the opening area of the second communication port 36e of the first turnaround path 36 and the opening area of the second communication port 37e of the second turnaround path 37. In such a configuration, the flow path resistance when the air passes through the individual bubble discharge ports 32a increases, and the air in the bubble discharge chamber 35 stagnates near the individual bubble discharge ports 32a. Due to this stagnation, the pressure of the entire air stored in the bubble discharge chamber 35 is equalized, and air passing amounts per unit time in the individual bubble discharge ports 32a become substantially the same. Therefore, according to the bubble generation device 30, bubbles of about the same size can be discharged from each of the six bubble discharge ports 32a.

The shape of the bubble discharge port 32a is not limited to a circular shape, and may be another shape such as a rectangular shape. In the illustrated bubble generation device 30, the cover plate 32b including the six bubble discharge ports 32a is fixed to the top plate 32, but a plurality of bubble discharge ports may be provided in the top plate 32 itself. However, in the configuration in which the cover plate 32b is fixed to the top plate 32, the diameter and the arrangement interval of the bubble discharge ports 32a can be easily adjusted by replacing the cover plate 32b.

The bubble generation device 30 according to the embodiment includes two gas storage chambers (33, 34), but the number of gas storage chambers is not limited to two, and may be one or three or more. In addition, in the bubble generation device 30 includes, the turnaround path (36, 37) has a shape formed by the plate-shaped partition wall, but the shape is not particularly limited. The turnaround path has any shape as long as it includes the first communication port (36d, 37d), the second communication port (36e, 37e), the lowering portion (36a, 37a), the turnaround portion (36b, 37b), and the rising portion (36c, 37c).

As illustrated in FIG. 4, the bubble discharge port 32a opens "upward". In such a configuration, as compared with a configuration including a bubble discharge port that opens in a direction different from the "upward" direction, a phenomenon that the "external preceding air" is cut from the "internal succeeding air" by a peripheral wall of the bubble discharge port is less likely to occur, and thus bubbles having a larger diameter can be formed.

As illustrated in FIGS. 6 and 10, the shapes of the lowering portion (36a, 37a), the turnaround portion (36b, 37b), and the rising portion (36c, 37c) in each of the two turnaround paths (36, 37) are shapes extending along the arrangement direction of the six bubble discharge ports 32a. The shape of the bubble discharge chamber 35 is also a shape extending along the arrangement direction of the six bubble discharge ports 32a. In each of the two turnaround paths (36, 37), the shape of each of the first communication port (36d, 37d) and the second communication port (36e, 37e) is also a shape extending along the arrangement direction of the six bubble discharge ports 32a.

In such a configuration, it is possible to allow individual bubbles to enter between (hereinafter, referred to as an "inter-membrane region") the filtration membranes adjacent to each other in the plurality of filtration membranes (23 in FIG. 3) installed in the above-described arrangement direction. The bubbles that have entered the "inter-membrane region" can apply a sufficient shearing force to each of the filtration membranes on both sides by scrubbing to satisfactorily peel off contaminants from the surface of each filtration membrane.

As described above, the bubble generation device 30 includes a plurality of sets of the gas storage chamber and the turnaround path (set of the first gas storage chamber 33 and the first turnaround path 36 and set of the second gas storage chamber 34 and the second turnaround path 37). Each set of turnaround paths (36, 37) communicates with the common bubble discharge chamber 35 at each second communication port (36e, 37e). In such a configuration, by arranging each of the plurality of sets according to the layout of the plurality of bubble discharge ports 32a, the pressure of the entire air stored in the bubble discharge chamber 35 can be made uniform, and the size of each bubble can be made uniform. For example, in the bubble generation device 30 according to the embodiment, one of the two sets (the gas storage chamber and the turnaround path) is arranged on one side in the "arrangement orthogonal direction" of the bubble discharge port 32a, and the other is arranged on the other side in the "arrangement orthogonal direction". According to such a layout, the sizes of the bubbles can be made uniform on one side and the other side in the "arrangement orthogonal direction".

In the bubble generation device 30 according to the embodiment, as illustrated in each drawing, the lower portions of the two gas storage chambers (33, 34) and the lower portion of the bubble discharge chamber 35 communicate with each other. In addition, the bubble generation device 30 includes a lower end opening (39 in FIG. 4) as an opening facing downward below each of the two gas storage chambers (33 and 34) and the bubble discharge chamber 35. In such a configuration, as indicated by a thick arrow in FIG. 11, when the bubble is separated from the bubble discharge port 32a, the external raw water $W_1$ is taken into the inside from the lower end opening (39 in FIG. 4) below the bubble and rises toward the bubble discharge port 32a. With this rise, the bubbles separated from the bubble discharge port 32a smoothly float up, so that it is possible to suppress the occurrence of bubble splitting due to the raw water $W_1$ below the bubbles not smoothly following the rise of the bubbles.

In addition, according to the bubble generation device 30 having the above-described configuration, when shifting from the fourth phase illustrated in FIG. 11 to the first phase illustrated in FIG. 8, it is possible to quickly raise the water level of the lowering portion (36a, 37a) of the turnaround path and to suppress the generation of small-diameter bubbles due to the delay in the rise of the water level. Specifically, in the fourth phase, as illustrated in FIG. 11, the water level at the lowering portion (36a, 37a) of the turnaround path is lowered to the vicinity of the inlet of the turnaround portion (36b, 37b). In this state, when the air supplied from the air supply pipe 14 pushes down the air in the lowering portion (36a, 37a) via the air in the upper portion of the gas storage chamber (33, 34), the air in the lowering portion (36a, 37a) enters the turnaround portion (36b, 37b) and exceeds the turn-around point. Then, small-diameter bubbles with a small amount of air are discharged from the bubble discharge port 32a. Therefore, immediately before the end of the fourth phase, it is desirable to promptly equalize the water level between the lowering portion (36a, 36b) and the gas storage chamber (33, 34) having a water level higher than the water level of the lowering portion and to promptly raise the water level of the lowering portion.

Therefore, in the bubble generation device 30 according to the embodiment, immediately before the end of the fourth phase, the flow of the raw water $W_1$ indicated by the thick arrow in FIG. 11 is promoted by the raw water $W_1$ taken in through the lower end opening (39 in FIG. 4). This promotes the flow of the raw water $W_1$ that enters the rising portion (36c, 37c) from the bubble discharge chamber 35 through the second communication port (36e, 37e) and further lowers the rising portion. In addition, by allowing the raw water $W_1$ in the gas storage chamber (33, 34) to flow out to the outside through the lower end opening (39 in FIG. 4), lowering of the water level in the gas storage chamber is promoted. As a result, according to the bubble generation device 30, the water level in the lowering portion (36a, 37a) can be quickly raised, and the generation of the small-diameter bubbles caused by the delay in the rise of the water level can be suppressed.

As illustrated in FIG. 5, since the turnaround portion (36b, 37b) of the turnaround path (36, 37) also functions as the bottoms of the lowering portion (36a, 37a) and the rising portion (36c, 37c), a solid material in the raw water $W_1$ in the lowering portion and the rising portion precipitates during non-operation. For example, the solid material is a solid material including sand, silt, a mass of microorganisms, and the like. When the solid material adheres to a lower wall (bottom wall) of the turnaround portion (36b, 37b) and the adhering substance gradually grows, the turnaround portion (36b, 37b) may be blocked.

Therefore, as illustrated in FIG. 5, the bubble generation device 30 according to the embodiment includes an opening in a lower wall of the turnaround portion facing "downward". The bubble generation device 30 discharges the solid material precipitated in the turnaround portion (36b, 37b) to the outside of the turnaround portion through the opening (36f, 37f), thereby suppressing the occurrence of blocking of the turnaround portion due to the fixing of the solid material.

In the third phase of the batch processing illustrated in FIG. 10, the air in the turnaround portion (36b, 37b) may leak from the opening (36f, 37f), or the raw water $W_1$ existing below the turnaround portion may enter the turnaround portion from the opening, thereby hindering an increase in diameter of the bubbles. However, according to the experiments of the present inventors, even in the configuration in which the opening (36f, 37f) is provided, it is possible to generate large-diameter bubbles by appropriately setting the size of the opening, similarly to the configuration in which the opening is not provided.

In the liquid filtration device (50) according to the embodiment, the bubbles discharged from the six bubble discharge ports 32a in mutually equal sizes become one long large bubble continuously, and then the bubbles are divided by the plurality of filtration membranes (23) and enter the "inter-membrane region".

The present inventors experimentally manufactured a test device having the same configuration as the liquid filtration device (50) according to the embodiment, and conducted an experiment of measuring the vibration amount of the filtration membrane (23 in FIG. 3) by scrubbing using bubbles. The fact that the measured value of the vibration amount of the filtration membrane is large suggests that the amount of oscillation of the raw water $W_1$ in the vicinity of the membrane surface is large and the shearing force due to scrubbing is high. Therefore, the shearing force of the membrane surface can be indirectly evaluated by measuring the vibration amount.

Figure 12:
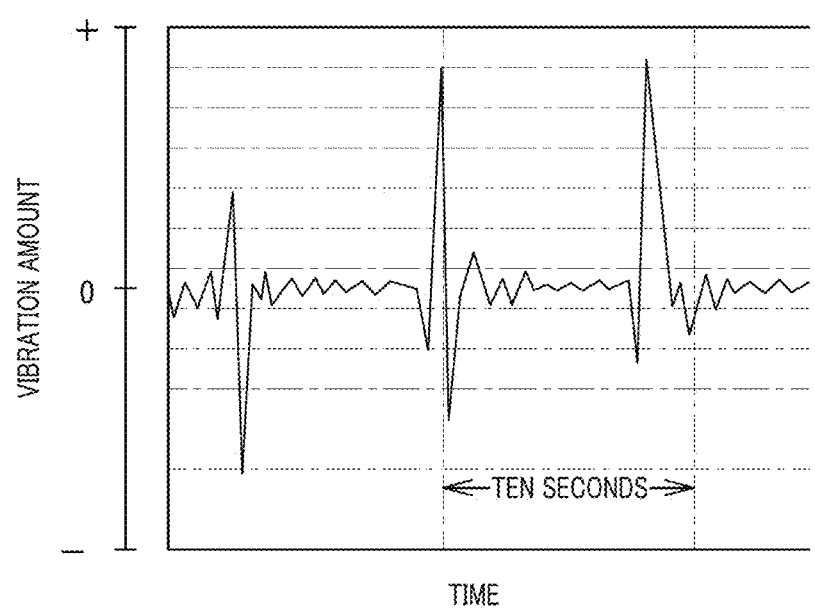
FIG. 12 is a graph illustrating a relationship between a vibration amount and time obtained by an experiment.

FIG. 12 is a graph illustrating a relationship between the vibration amount and time obtained by the above-described experiment. In this graph, a time zone in which the vibration amount rapidly changes vertically is a time zone in which the bubbles oscillate the raw water $W_1$ in the vicinity of the surface of the filtration membrane (23). As can be seen from the graph, in the test device, bubbles are discharged from the bubble generation device (30) at intervals of about eight seconds.

A steep peak of the vibration amount indicates that large-diameter bubbles instantaneously apply a strong shearing force to the surface of filtration membrane (23). From these experimental results, it has been confirmed that good scrubbing can be achieved by instantaneously discharging large-diameter bubbles from the bubble generation device (30) according to the embodiment at a constant cycle to apply a strong shearing force to the surface of the filtration membrane (23).

Next, an example in which a more characteristic configuration is added to the bubble generation device (20) according to the embodiment will be described. The configuration of the bubble generation device (20) according to the embodiment is the same as that of the embodiment unless otherwise noted.

In the bubble generation device 30 according to the embodiment illustrated in FIG. 8, it is assumed that there is a difference in air supply speed between one and the other of the two air supply pipes 14. This may cause the following problems. That is, in one of the turnaround portion 36b of the first turnaround path 36 and the turnaround portion 37b of the second turnaround path 37, the air inside reaches the turn-around point earlier than the other, and the air having a small diameter only by the supply of the air is discharged from the bubble discharge port 32a. Thereafter, the air in the other inside reaches the turn-around point, and the small-diameter bubbles only by the supply of the air are discharged from the bubble discharge port 32a. As a result, the small-diameter bubbles are discharged from bubble discharge port 32a in a cycle shorter than the cycle in the case of discharging the large-diameter bubbles, which may cause cleaning failure of the surface of filtration membrane (23).

Figure 13:
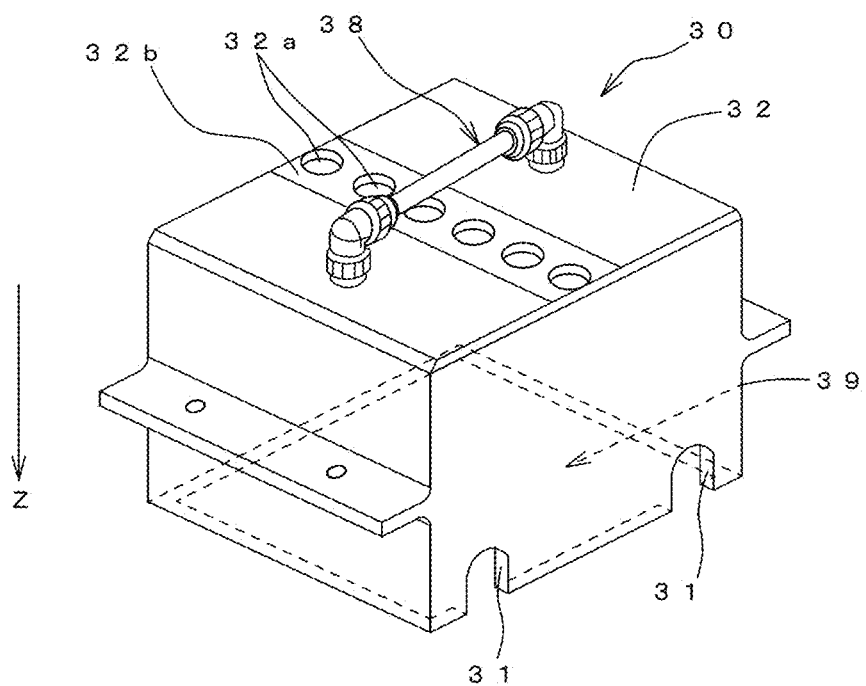
FIG. 13 is a perspective view illustrating a bubble generation device according to an example.
Figure 14:
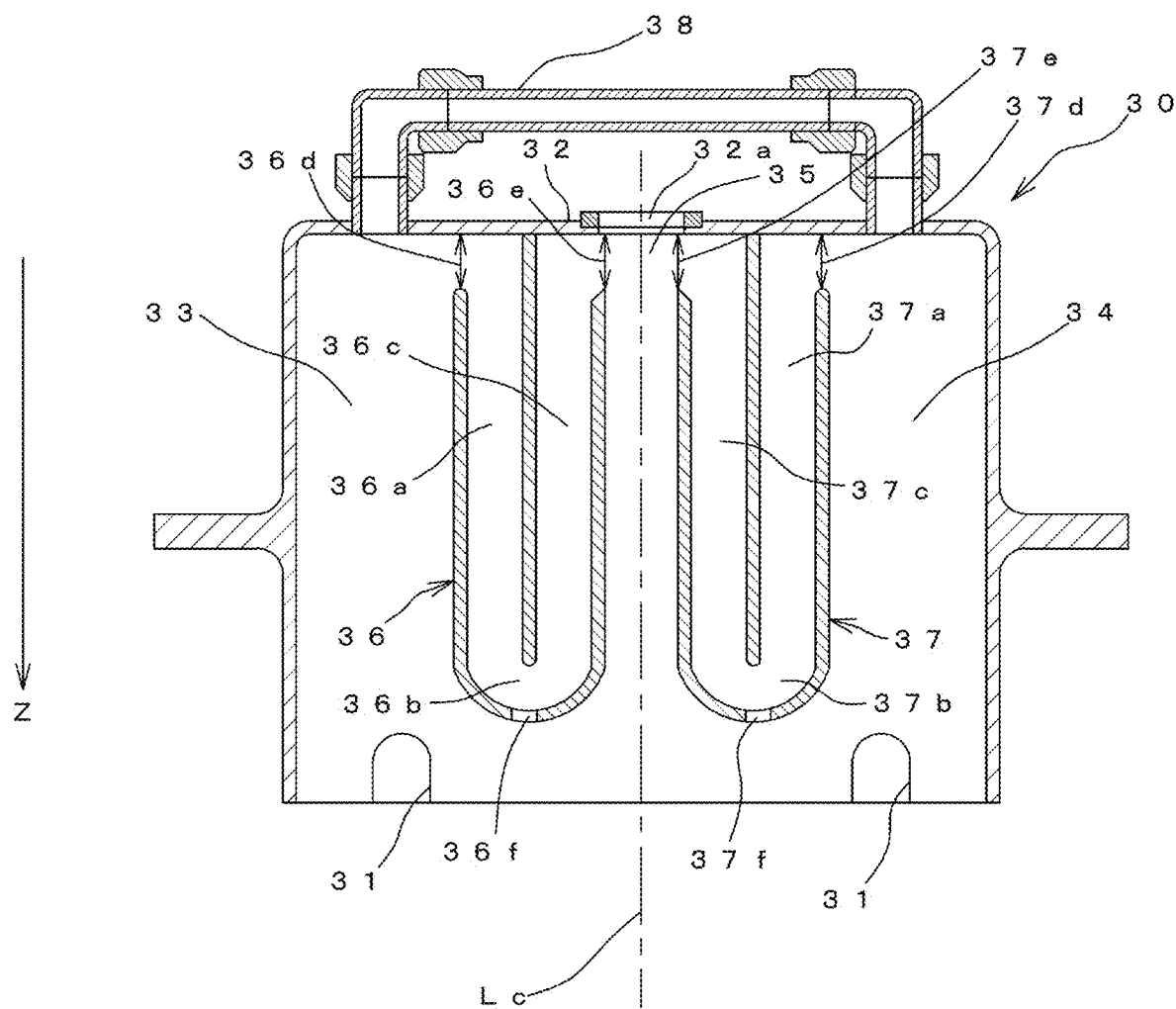
FIG. 14 is a cross-sectional view illustrating the bubble generation device.

FIG. 13 is a perspective view illustrating the bubble generation device 30 according to an example. FIG. 14 is a cross-sectional view illustrating the bubble generation device 30 according to the example. The bubble generation device 30 according to the example includes a communication pipe 38 that communicates with the upper portion (more specifically, top end) of the first gas storage chamber 33 and the upper portion (more specifically, top end) of the second gas storage chamber 34.

Figure 15:
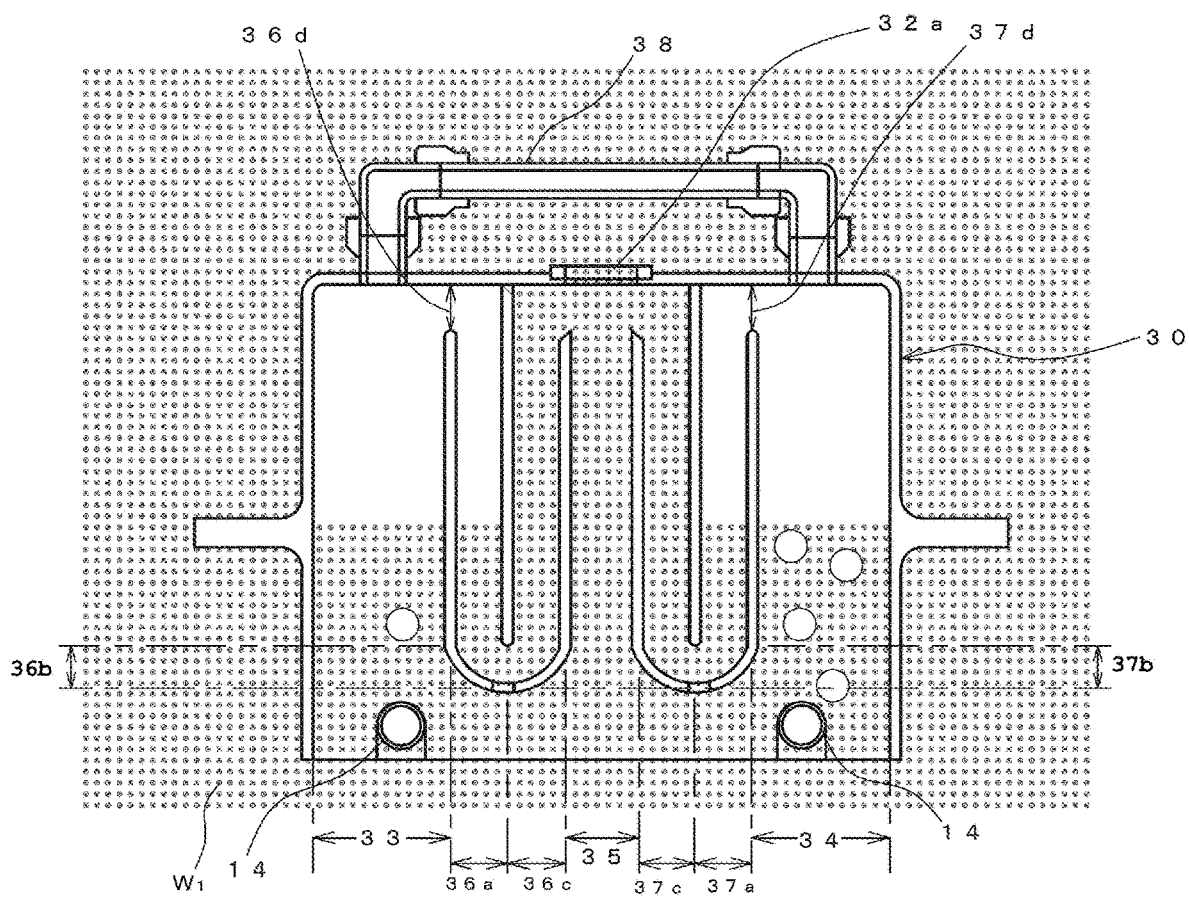
FIG. 15 is a cross-sectional view illustrating an example of a state of the bubble generation device in the second phase of the batch processing.

FIG. 15 is a cross-sectional view illustrating an example of a state of the bubble generation device 30 in the second phase of the batch processing. In the illustrated example, the supply speed of air to the second gas storage chamber 34 is higher than the supply speed of air to the first gas storage chamber 33. Nevertheless, the water level of the raw water $W_1$ is substantially the same in each of the first gas storage chamber 33, the lowering portion 36a of the first turnaround path 36, and the lowering portion 37a of the second turnaround path 37.

In the second gas storage chamber 34, the storage amount of air is instantaneously increased as compared with the first gas storage chamber 33 due to the difference in the air supply amount, but the air pressure in the second gas storage chamber 34 is higher than the air pressure in the first gas storage chamber 33 due to this increase. Then, the air in the second gas storage chamber 34 moves to the first gas storage chamber 33 having the lower pressure to eliminate the air pressure difference. As a result, the water level of the raw water $W_1$ is adjusted to the same height in each of the first gas storage chamber 33, the lowering portion 36a of the first turnaround path 36, and the lowering portion 37a of the second turnaround path 37.

According to the bubble generation device 30 having such a configuration, it is possible to avoid cleaning failure of the surface of the filtration membrane (23) due to a difference in the air supply speed between the first gas storage chamber 33 and the second gas storage chamber 34.

Although the bubble generation device 30 according to the example has a configuration in which the communication pipe 38 can be disassembled by four joints, the communication pipe 38 may have any structure as long as the upper portion of the first gas storage chamber 33 and the upper portion of the second gas storage chamber 34 communicate with each other. In FIG. 14, the structure of the communication pipe 38 is illustrated in a simplified manner for the sake of convenience.

Figure 16:
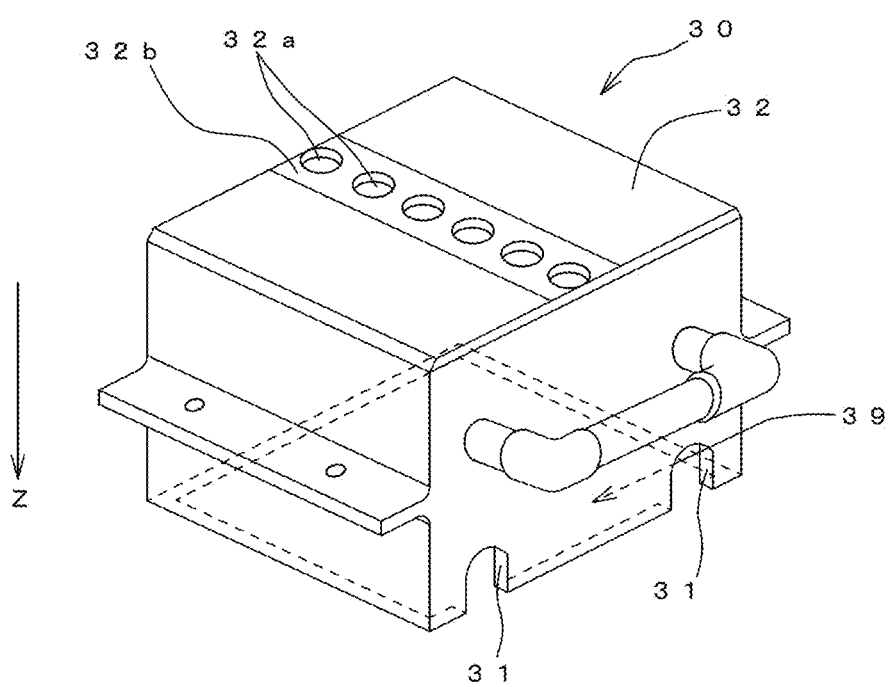
FIG. 16 is a perspective view illustrating a bubble generation device according to a modification.
Figure 17:
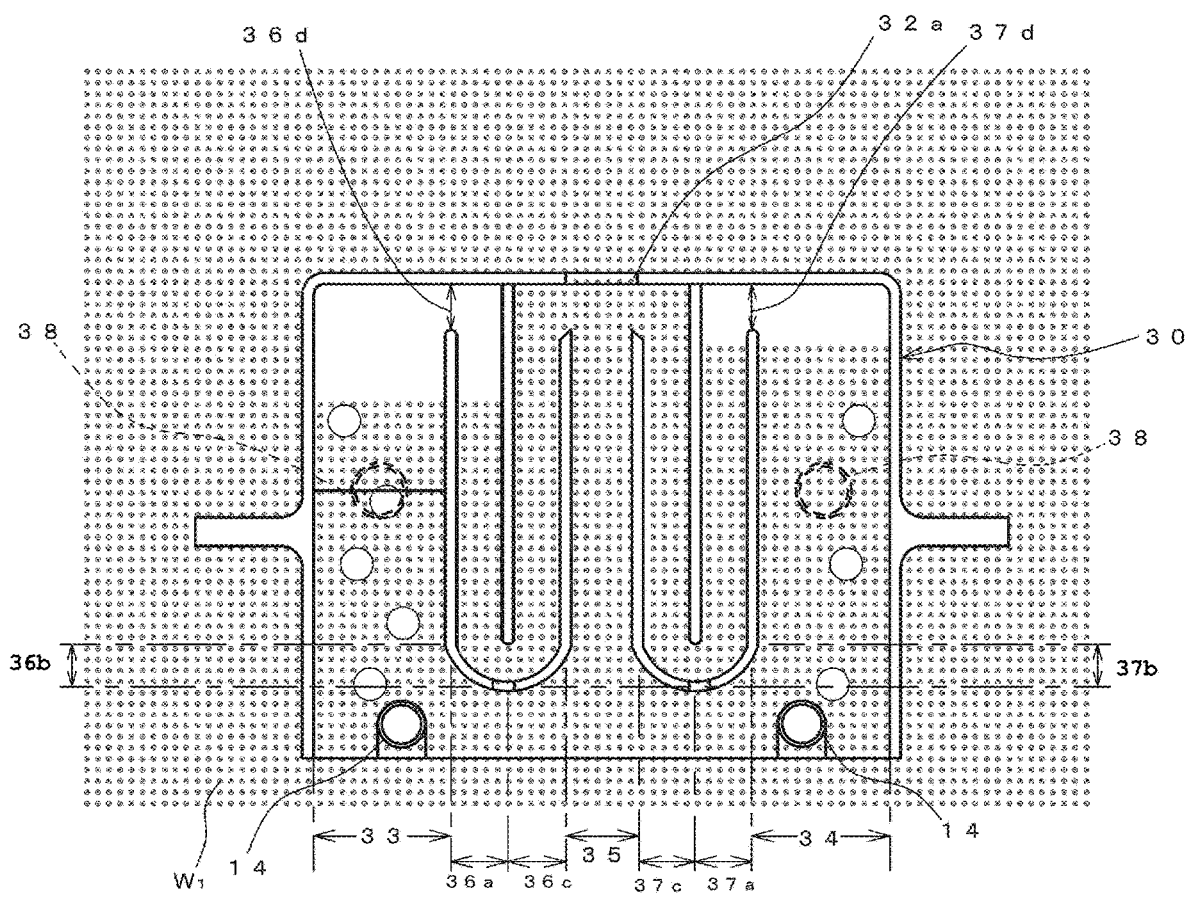
FIG. 17 is a cross-sectional view illustrating the bubble generation device in a state of a first phase in batch processing.
Figure 18:
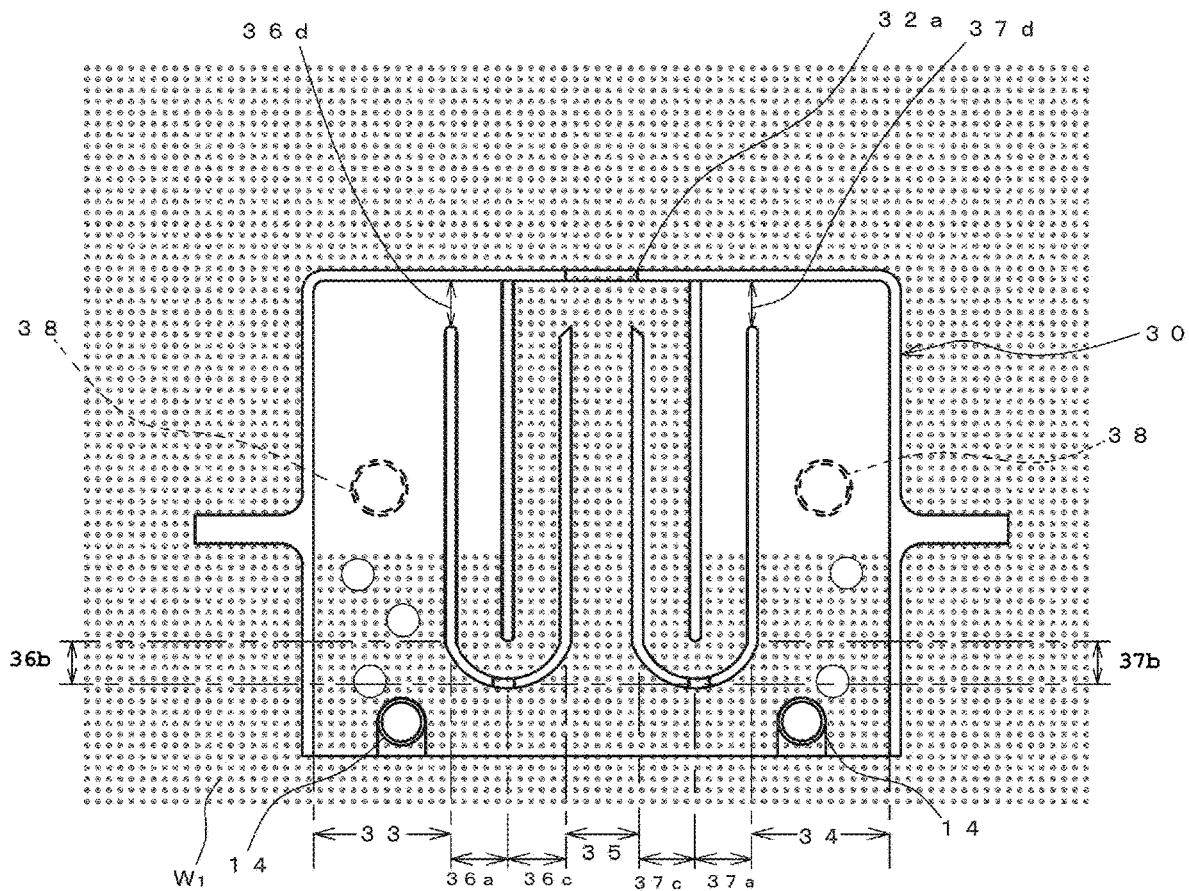
FIG. 18 is a cross-sectional view illustrating the bubble generation device in a second phase state in batch processing.

Although the configuration in which the top end of the first gas storage chamber 33 and the top end of the second gas storage chamber 34 communicate with each other by the communication pipe 38 has been described, the position of communication is not limited to the top end. For example, as illustrated in FIG. 16, the intermediate portion in the height direction of the first gas storage chamber 33 and the intermediate portion in the height direction of the second gas storage chamber 34 may communicate with each other. In this case, as illustrated in FIG. 17, until the level of air in one (the first gas storage chamber 33 in the illustrated example) of the two gas storage chambers (33, 34) having a higher air supply speed is lowered to the position of the communication pipe 38, there is a difference in the storage amounts of air in the two gas storage chambers. However, after the level of air in the gas storage chamber with the higher air supply speed is lowered to the position of the communication pipe 38, the air storage amounts of the two gas storage chambers (33, 34) become equal as illustrated in FIG. 18. The communicating positions of the two gas storage chambers (33, 34) may be higher than the turnaround portion (36b, 37b).

The present invention is not limited to the above-described embodiments and examples, and configurations different from the embodiments and examples can be adopted within a range where the configurations of the present invention can be applied. The present invention has unique effects for each aspect described below.

First Aspect

According to a first aspect, there is provided a bubble generation device (for example, bubble generation device 30) configured to intermittently discharge bubbles from each of a plurality of bubble discharge ports (for example, bubble discharge port 32a), the bubble generation device including: a gas storage chamber (for example, first gas storage chamber 33, second gas storage chamber 34) that stores a liquid (for example, raw water $W_1$) therein and stores a gas (for example, air) supplied into the liquid above the liquid; a turnaround path (for example, first turnaround path 36, second turnaround path 37) that communicates with an upper portion of the gas storage chamber, extends downward, turns back, and extends upward; the plurality of bubble discharge ports that discharge the gas passing through the turnaround path as bubbles; and a bubble discharge chamber (for example, bubble discharge chamber 35) that communicates with each of the plurality of bubble discharge ports, in which the turnaround path includes a first communication port (for example, first communication port 36d, 37d) communicating with the gas storage chamber and a second communication port (for example, second communication port 36e, 37e) communicating with the bubble discharge chamber on a downstream side of a turn-around point of the turnaround path in a gas traveling direction, opening areas of the plurality of bubble discharge ports are the same as each other, and a sum of the opening areas is smaller than an opening area of the second communication port.

In such a configuration, a flow path resistance when the gas passes through the individual bubble discharge ports increases, and the gas in the bubble discharge chamber stagnates near the individual bubble discharge ports. Due to this stagnation, the pressure of the entire gas stored in the bubble discharge is equalized, and the air passing amounts per unit time at the individual bubble discharge ports become substantially the same. Therefore, according to the first aspect, it is possible to discharge bubbles of the same size from each of the plurality of bubble discharge ports.

Second Aspect

A second aspect includes the configuration of the first aspect, in which each of the plurality of bubble discharge ports is opened upward and arranged in a straight line, the turnaround path includes a lowering portion (for example, lowering portion 36a, 37a) extending downward from the first communication port, a turnaround portion (for example, turnaround portion 36b, 37b) turning back upward from below, and a rising portion (for example, rising portion 36c, 37c) extending upward from the turnaround portion and reaching the second communication port, a shape of each of the lowering portion, the turnaround portion, the rising portion, and the bubble discharge chamber is a shape extending along an arrangement direction of the plurality of bubble discharge ports, and a shape of each of the first communication port and the second communication port is a shape extending along the arrangement direction.

In such a configuration, as compared with a configuration including a bubble discharge port that opens in a direction different from the "upward" direction, a phenomenon that the "external preceding air" is cut from the "internal succeeding air" by a peripheral wall of the bubble discharge port is less likely to occur, and thus bubbles having a larger diameter can be formed.

In addition, according to the second aspect, bubbles that have entered an "inter-membrane region" can apply a sufficient shearing force to each of the filtration membranes on both sides by scrubbing to satisfactorily peel off contaminants from the surface of each filtration membrane.

Third Aspect

A third aspect includes the configuration of the second aspect, in which a plurality of sets of the gas storage chamber and the turnaround path are provided, the turnaround paths of the sets communicate with the bubble discharge chamber common to the second communication ports, and the sum is smaller than a sum of the opening areas of the second communication ports.

According to such a configuration, by arranging each of the plurality of sets according to a layout of the plurality of bubble discharge ports, the pressure of the entire air stored in the bubble discharge chamber can be made uniform, and the size of each bubble can be made uniform.

Fourth Aspect

A fourth aspect includes the configuration of the third aspect, in which lower portions of the plurality of gas storage chambers and lower portions of the bubble discharge chambers communicate with each other, and an opening (for example, lower end opening 39) facing downward is provided below each of the plurality of gas storage chambers and the bubble discharge chamber.

In such a configuration, when the bubble is separated from the bubble discharge port, an external liquid is taken into the inside from the opening below the bubble, and rises toward the bubble discharge port. With this rise, the bubbles separated from the bubble discharge port to smoothly float up, so that it is possible to suppress the occurrence of bubble splitting due to the liquid below the bubbles not smoothly following the rise of the bubbles.

Fifth Aspect

A fifth aspect includes the configuration of the third aspect or the fourth aspect, in which the plurality of gas storage chambers communicate with each other at a height position above the turnaround portion.

According to such a configuration, at the time of transition from an end of batch processing to an initial stage of the next batch processing, a water level of the lowering portion of the turnaround path is rapidly raised, and generation of small-diameter bubbles caused by the delay in the rise of the water level can be suppressed.

Sixth Aspect

A sixth aspect includes the configuration of any one of the first to fifth aspects, in which an opening facing downward is provided in a lower wall of the turnaround portion.

According to such a configuration, by discharging a solid material precipitated in the turnaround portion to the outside of the turnaround portion through the opening of the lower wall of the turnaround portion, it is possible to suppress the occurrence of blocking of the turnaround portion due to the fixing of the solid material.

Seventh Aspect

According to a seventh aspect, there is provided a liquid filtration device (for example, liquid filtration device 50) including: a filtration membrane (for example, filtration membrane 23) that has a membrane portion (for example, portion other than hollow portion of filtration membrane 23) and a hollow (for example, hollow 23a) surrounded by the membrane portion, and receives a suction force in the hollow in a state of being disposed in a liquid to take an external liquid into the hollow through the membrane portion and filter the liquid; and a bubble generation device that is disposed below the filtration membrane and discharges bubbles toward the filtration membrane, in which the bubble generation device is the bubble generation device according to any one of the first to sixth aspects.

According to such a configuration, the filtration membrane can be satisfactorily scrubbed by large-diameter bubbles discharged from the bubble generation device.

The present application claims priority based on Japanese Patent Application No. 2020-157702 filed on Sep. 18, 2020, the entire contents of which are incorporated herein by reference.

INDUSTRIAL APPLICABILITY

The present invention is applicable to a liquid treatment device such as a liquid filtration device.

REFERENCE SIGNS LIST

20 membrane module
21 casing
22 membrane element
23 filtration membrane
23a hollow
30 bubble generation device
32 top plate
32a bubble discharge port
33 first gas storage chamber
34 second gas storage chamber
35 bubble discharge chamber
36 first turnaround path
36a lowering portion
36b turnaround portion
36c rising portion
36d first communication port
36e second communication port
36f opening
37 second turnaround path
37a lowering portion
37b turnaround portion
37c rising portion
37d first communication port
37e second communication port
37f opening
38 communication pipe
39 lower end opening
$W_1$ raw water (liquid)

The invention claimed is:

1. A bubble generation device configured to intermittently discharge bubbles from each of a plurality of bubble discharge ports, the bubble generation device comprising:
   a gas storage chamber that stores a liquid therein and stores a gas supplied into the liquid above the liquid;
   a turnaround path that communicates with an upper portion of the gas storage chamber, extends downward, turns back, and extends upward;
   the plurality of bubble discharge ports that discharge the gas passing through the turnaround path as bubbles; and
   a bubble discharge chamber that communicates with each of the plurality of bubble discharge ports, wherein
   a plurality of sets of the gas storage chamber and the turnaround path are provided,
   each of the plurality of the turnaround path includes a first communication port communicating with the gas storage chamber, a second communication port communicating with the bubble discharge chamber on a downstream side of a turn-around point of the turnaround path in a gas traveling direction, a lowering portion extending downward from the first communication port, a turnaround portion turning back upward from below, and a rising portion extending upward from the turnaround portion and reaching the second communication port, and communicate with the bubble discharge chamber common to the second communication ports,
   each of the plurality of bubble discharge ports is opened upward and arranged in a straight line,
   opening areas of the plurality of bubble discharge ports are the same as each other,
   a shape of each of the lowering portion, the turnaround portion, the rising portion, and the bubble discharge chamber is a shape extending along an arrangement direction of the plurality of bubble discharge ports,
   a shape of each of the first communication port and the second communication port is a shape extending along the arrangement direction and
   a sum of the opening areas in the plurality of the bubble discharge ports is smaller than a sum of an opening area of the second communication port in each of the plurality of the turnaround portions.

2. The bubble generation device according to claim 1, wherein lower portions of the plurality of gas storage chambers and lower portions of the bubble discharge chambers communicate with each other, and
   an opening facing downward is provided below each of the plurality of gas storage chambers and the bubble discharge chamber.

3. The bubble generation device according to claim 1, wherein the plurality of gas storage chambers communicate with each other at a height position above the turnaround portion.

4. The bubble generation device according to claim 1, wherein an opening facing downward is provided in a lower wall of the turnaround portion.

5. A liquid filtration device comprising:
   a filtration membrane that has a membrane portion and a hollow surrounded by the membrane portion, and receives a suction force in the hollow in a state of being disposed in a liquid to take an external liquid into the hollow through the membrane portion and filter the liquid; and a bubble generation device that is disposed below the filtration membrane and discharges bubbles toward the filtration membrane, wherein
the bubble generation device is the bubble generation device according to claim 1.

6. A bubble generation device configured to intermittently discharge bubbles from each of a plurality of bubble discharge ports, the bubble generation device comprising:
a gas storage chamber that stores a liquid therein and stores a gas supplied into the liquid above the liquid;
a turnaround path that communicates with an upper portion of the gas storage chamber, extends downward, turns back, and extends upward;
the plurality of bubble discharge ports that discharge the gas passing through the turnaround path as bubbles;
only one set of the gas storage chamber and the turnaround path are provided; and
a bubble discharge chamber that communicates with each of the plurality of bubble discharge ports, wherein
the turnaround path includes a first communication port communicating with the gas storage chamber and a second communication port communicating with the bubble discharge chamber on a downstream side of a turn-around point of the turnaround path in a gas traveling direction,
opening areas of the plurality of bubble discharge ports are the same as each other, and
a sum of the opening areas is smaller than an opening area of the second communication port.

7. The bubble generation device according to claim 6, wherein each of the plurality of bubble discharge ports is opened upward and arranged in a straight line,
the turnaround path includes a lowering portion extending downward from the first communication port, a turnaround portion turning back upward from below, and a rising portion extending upward from the turnaround portion and reaching the second communication port,
a shape of each of the lowering portion, the turnaround portion, the rising portion, and the bubble discharge chamber is a shape extending along an arrangement direction of the plurality of bubble discharge ports, and
a shape of each of the first communication port and the second communication port is a shape extending along the arrangement direction.

8. The bubble generation device according to claim 6, wherein an opening facing downward is provided in a lower wall of the turnaround portion.

9. A liquid filtration device comprising:
a filtration membrane that has a membrane portion and a hollow surrounded by the membrane portion, and receives a suction force in the hollow in a state of being disposed in a liquid to take an external liquid into the hollow through the membrane portion and filter the liquid; and
a bubble generation device that is disposed below the filtration membrane and discharges bubbles toward the filtration membrane, wherein
the bubble generation device is the bubble generation device according to claim 6.

* * * * *